United States Patent
Asanuma et al.

(10) Patent No.: US 10,718,862 B2
(45) Date of Patent: Jul. 21, 2020

(54) RADAR DEVICE AND TARGET DETECTING METHOD

(71) Applicant: DENSO TEN LIMITED, Kobe-shi, Hyogo (JP)

(72) Inventors: Hisateru Asanuma, Kobe (JP); Yasuhiro Suedomi, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 280 days.

(21) Appl. No.: 15/832,225

(22) Filed: Dec. 5, 2017

(65) Prior Publication Data
US 2018/0203107 A1 Jul. 19, 2018

(30) Foreign Application Priority Data

Jan. 17, 2017 (JP) .................... 2017-006231

(51) Int. Cl.
| | | |
|---|---|---|
| G01S 13/68 | (2006.01) | |
| G01S 13/931 | (2020.01) | |
| G01S 7/35 | (2006.01) | |
| G01S 13/34 | (2006.01) | |
| G01S 7/41 | (2006.01) | |
| G01S 13/72 | (2006.01) | |

(52) U.S. Cl.
CPC .............. G01S 13/68 (2013.01); G01S 7/354 (2013.01); G01S 7/415 (2013.01); G01S 13/343 (2013.01); G01S 13/345 (2013.01); G01S 13/726 (2013.01); G01S 13/931 (2013.01); G01S 2007/356 (2013.01); G01S 2013/93271 (2020.01)

(58) Field of Classification Search
CPC combination set(s) only.
See application file for complete search history.

(56) References Cited

U.S. PATENT DOCUMENTS

| | | | | |
|---|---|---|---|---|
| 2009/0073026 A1* | 3/2009 | Nakagawa | ............... | G01S 3/74 342/107 |
| 2011/0205102 A1* | 8/2011 | Shibata | ................ | G01S 13/345 342/70 |
| 2013/0307718 A1* | 11/2013 | Aoki | ....................... | G01S 13/50 342/61 |

(Continued)

FOREIGN PATENT DOCUMENTS

| | | |
|---|---|---|
| JP | 2005-337883 A | 12/2005 |
| JP | 2007-226587 A | 9/2007 |

(Continued)

Primary Examiner — Mamadou L Diallo
(74) Attorney, Agent, or Firm — Oliff PLC

(57) ABSTRACT

There is provided a radar device which detects targets by performing a signal processing procedure based on a frequency-modulated continuous wave and the reflected waves of the transmission wave from the targets. A signal processing unit is configured to periodically perform the signal processing procedure based on beat signals which are differential waves between the transmission wave and the reflected waves. A monitoring unit is configured to monitor each of processing states of processes which are sequentially performed in the signal processing procedure. A changing unit is configured to change a processing condition for the subsequent-stage processes of a process, according to the processing state of the process, if the monitoring unit detects that the process is in a high load state, from the processing states.

8 Claims, 19 Drawing Sheets

(56) References Cited

U.S. PATENT DOCUMENTS

| | | | | |
|---|---|---|---|---|
| 2014/0210604 A1* | 7/2014 | Kawashima | ........... | B60K 35/00 |
| | | | | 340/439 |
| 2015/0146191 A1* | 5/2015 | Kotake | ................... | G01S 17/42 |
| | | | | 356/28.5 |
| 2016/0103210 A1* | 4/2016 | Ochimizu | ............... | G01S 17/42 |
| | | | | 356/5.01 |
| 2017/0307727 A1* | 10/2017 | Goda | ....................... | G01S 7/352 |
| 2017/0363716 A1* | 12/2017 | Asanuma | ................ | G01S 7/354 |
| 2018/0095173 A1* | 4/2018 | Kurono | ................ | B60W 30/08 |
| 2019/0239773 A1* | 8/2019 | Uchida | ................... | G01S 13/32 |

FOREIGN PATENT DOCUMENTS

| | | |
|---|---|---|
| JP | 2014-194399 A | 10/2014 |
| JP | 2015-210157 A | 11/2015 |

* cited by examiner

FIG. 6A

| PROCESS IDENTIFIER | THE MAXIMUM NUMBER OF PROCESSING OBJECTS | | SELECTION CONDITION EXAMPLE | ... |
| --- | --- | --- | --- | --- |
| | DEFAULT VALUE | CURRENT VALUE | | |
| PEAK EXTRACTING ☆ PROCESS | 96 | 96 | IN ORDER FROM TARGET HAVING THE HIGHEST SIGNAL LEVEL | ... |
| ANGLE ESTIMATING PROCESS | 96 | 48 | IN ORDER FROM TARGET CLOSEST TO THE FRONT OF VEHICLE | ... |
| PAIRING PROCESS | 96 | 48 | IN ORDER FROM TARGET CLOSEST TO THE FRONT OF VEHICLE, FROM TARGET CLOSEST TO VEHICLE, OR FROM TARGET HAVING THE HIGHEST VELOCITY | ... |
| CONTINUITY DETERMINING PROCESS | 96 | 48 | IN ORDER FROM TARGET HAVING PREDICTED CURRENT POSITION CLOSEST TO VEHICLE | ... |
| FILTERING PROCESS | 96 | 48 | IN ORDER FROM TARGET DATA ITEM HAVING SURVIVED FOR THE LONGEST TIME | ... |
| OBJECT CLASSIFYING PROCESS | 96 | 48 | IN ORDER FROM TARGETS OF MOVING OBJECTS TO TARGETS OF STILL OBJECTS | ... |
| UNNECESSARY-OBJECT DETERMINING PROCESS | 96 | 48 | IN ORDER FROM TARGETS CORRESPONDING TO NECESSARY OBJECTS | ... |
| GROUPING PROCESS | 96 | 48 | IN ORDER FROM TARGET CLOSEST TO LANE OF VEHICLE | ... |
| ⋮ | ⋮ | ⋮ | ⋮ | ⋮ |

☆ : HIGH LOAD STATE

FIG. 6B
| | PROCESSING TIME | | | | |
|---|---|---|---|---|---|
| | T | 2 x T | 3 x T | 4 x T | ... |
| MAXIMUM NUMBER OF PROCESSING OBJECTS | 96 | 48 (=96 x 1/2) | 32 (=96 x 1/3) | 24 (=96 x 1/4) | ... |
FIG. 6C
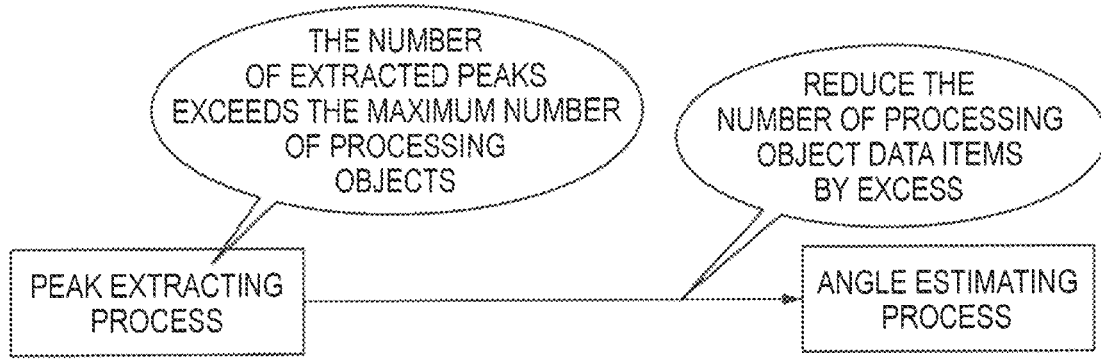
FIG. 6D
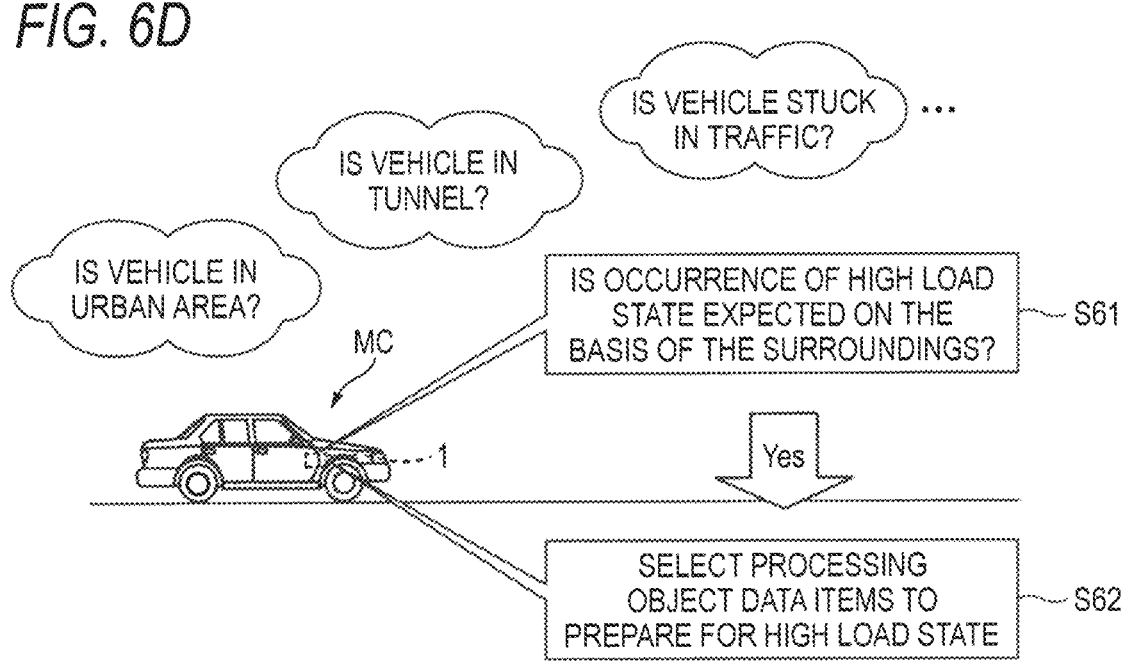

RADAR DEVICE AND TARGET DETECTING METHOD

CROSS-REFERENCE TO RELATED APPLICATIONS

This application is based on and claims priority under 35 USC 119 from Japanese Patent Application No. 2017-006231 filed on Jan. 17, 2017.

TECHNICAL FIELD

The present invention relates to a radar device and a target detecting method.

In the related art, a radar device which can be mounted on a vehicle or the like, and periodically detect targets by transmitting transmission waves from the corresponding vehicle, and receiving the reflected waves from targets, and performing a signal processing procedure on the basis of the reception signals is known (see Patent Document 1 for instance).

For example, if the radar device is an FM-CW (Frequency Modulated Continuous Wave) type radar device, in the signal processing procedure, for example, a peak extracting process, an angle estimating process, a pairing process, a continuity determining process, a filtering process, a target classifying process, an unnecessary-object determining process, a grouping process, and an output target selecting process can be sequentially performed.

In the peak extracting process, the angle estimating process, and the pairing process, frequency analysis is performed on beat signals representing the frequency differences between a transmission signal and reception signals, and from power peaks corresponding to individual frequencies obtained as the analysis result, target data including the distances, relative velocities, and angles of targets corresponding to the peaks is derived.

In the continuity determining process, determination on the temporal continuity between target data obtained in the past and target data of the latest cycle is performed. In the filtering process, the target data is smoothed. In the target classifying process, the target data is classified into preceding vehicles, oncoming vehicles, still objects, and the like.

In the unnecessary-object determining process, determination on targets unnecessary for system control is performed. In the grouping process, a plurality of target data items based on the same object is integrated into one. In the output target selecting process, targets which are necessary for system control and need to be notified to an external device are selected.

[Patent Document 1] Japanese Patent Application Laid-Open No. 2015-210157

However, the above-described technology according to the related art has room for improvement in order to improve the accuracy of detection on targets while securing the processing performance.

Specifically, in the signal processing procedure, first, on the assumption that peaks extracted in the peak extracting process correspond to individual targets, respectively, the angle estimating process and the subsequent processes are performed on each peak. Therefore, in some cases such as the case where the number of extracted peaks is large and the case where the number of the types of targets corresponding to peaks is large, there is a fear that the processing load may increase, resulting in a deterioration in the processing performance such as the response performance.

In this respect, in the case where the processing load is large, if target data relative to peaks of the latest cycle is discarded in the middle of processing, and extrapolation is performed with respect to the target data of the latest cycle, it is possible to secure the processing performance. However, in this case, extrapolation using target data estimated on the basis of the past target data deteriorates the target detection accuracy.

SUMMARY

It is therefore an object of the present invention is to provide a radar device and a target detecting method capable of improving the target detection accuracy while securing the processing performance.

According to an aspect of the embodiments of the present invention, a radar device according to an aspect of the present invention is a radar device for detecting targets by performing a signal processing procedure based on a frequency-modulated continuous wave and the reflected waves of the transmission wave from the targets, and includes a signal processing unit, a monitoring unit, and a changing unit. The signal processing unit periodically performs the signal processing procedure based on beat signals which are differential waves between the transmission wave and the reflected waves. The monitoring unit monitors each of processing states of processes which are sequentially performed in the signal processing procedures. The changing unit changes a processing condition for the subsequent-stage processes of a process, according to the processing state of the process, if the monitoring unit detects that the process is in a high load state, from the processing states.

According to the aspect of the embodiments of the present invention, it is possible to improve the target detection accuracy while securing the processing performance.

BRIEF DESCRIPTION OF THE DRAWINGS

Exemplary embodiments of the present invention will be described in detail based on the following figures, wherein:

FIG. 6A is a view illustrating an example of a processing condition;

FIG. 6B is a view illustrating an example of change of the maximum number of processing objects;

FIG. 6C is a view illustrating a first modification of selection of processing object data;

FIG. 6D is a view illustrating a second modification of selection of processing object data;

DETAILED DESCRIPTION

Hereinafter, embodiments of a radar device and a target detecting method will be described in detail with reference to the accompanying drawings. However, the present invention is not limited to the following embodiments.

Also, hereinafter, an overview of a target detecting method according to an embodiment will be described with reference to FIGS. 1A and 1B, and then a radar device 1 using the target detecting method according to the embodiment will be described with reference to FIGS. 2 to 10B.

In a description using FIGS. 1A to 8, as a first embodiment, the case where a radar device 1 is an FM-CW type will be exemplified. Also, in a description using FIGS. 9A to 10B, as a second embodiment, the case where a radar device 1 is an FCM (Fast Chirp Modulation) type will be exemplified.

First Embodiment

First, an overview of the target detecting method according to the present embodiment will be described with reference to FIGS. 1A and 1B. FIG. 1A is a view for explaining an overview of a target detecting method according to a comparative example. Also, FIG. 1B is a view for explaining an overview of the target detecting method according to the present embodiment. Also, it is assumed that "n" in FIGS. 1A and 1B is an arbitrary natural number greater than 1.

First, in the radar device for detecting targets, if one target is detected, a signal processing procedure including a peak extracting process, an angle estimating process, and the like is performed. Therefore, in the case of detecting a plurality of targets, the signal processing procedure needs to be performed on each of the targets.

Figure 1A:
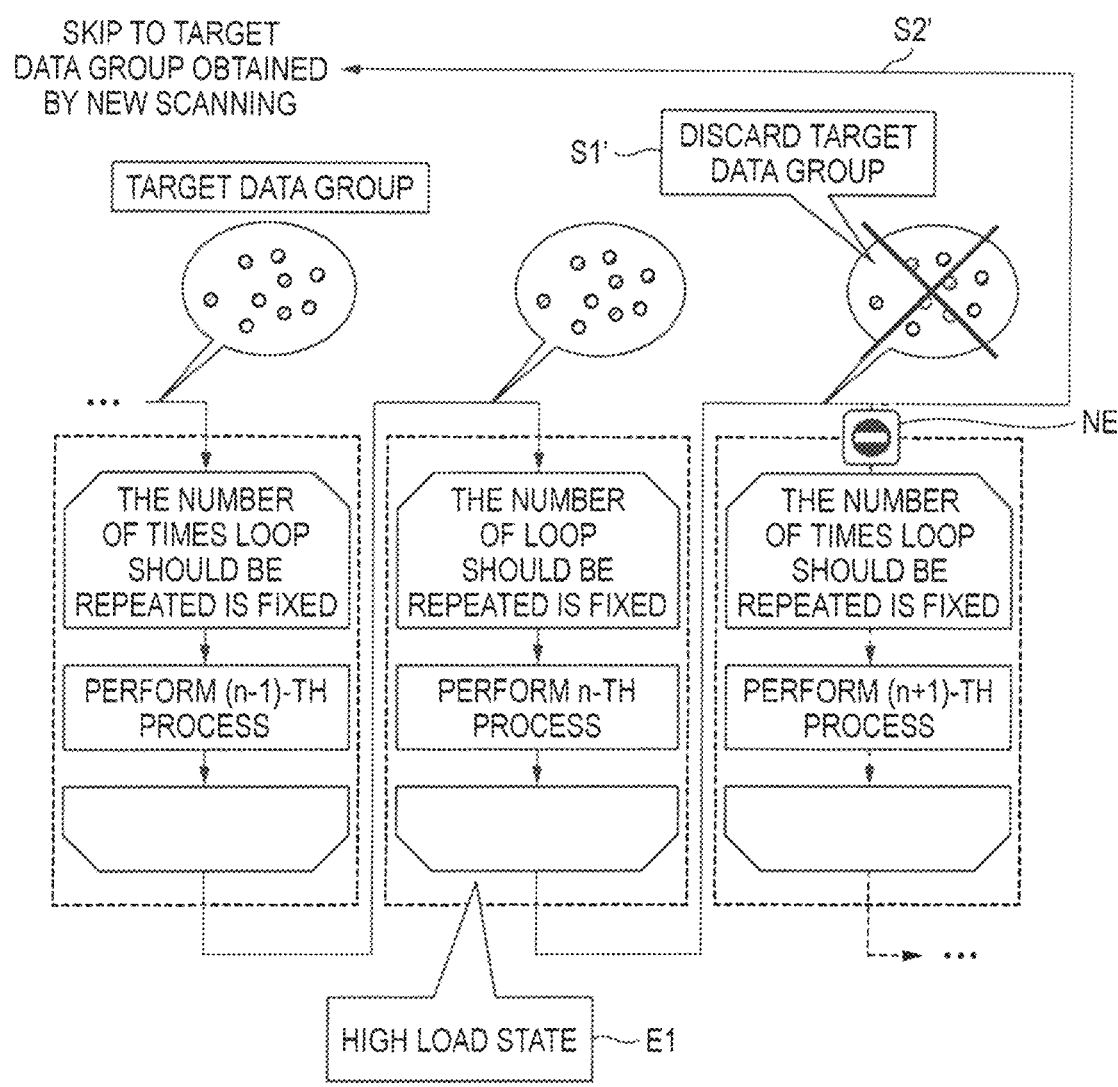
FIG. 1A is a view for explaining an overview of a target detecting method according to a comparative example.

For this reason, as shown in FIG. 1A, the target detecting method according to the comparative example uses a control structure in which in a signal processing procedure which is performed periodically whenever scanning with an electric wave is performed once and in which the number of times a loop of each of the processes should be repeated is fixed, and the processes are sequentially performed while a target data group is transferred as a processing object between the processes of the procedure. Also, here, data on a target includes various elements related to the target, such as a peak corresponding to the target, and the distance, relative velocity, angle, and the like derived on the basis of the corresponding peak, and is appropriately updated according to the process result of each process.

Therefore, since the number of times each loop should be repeated is fixed, the target detecting method according to the comparative example occupies a CPU (Central Processing Unit) of a radar device for a long time, regardless of whether the number of target data items is large or small. Therefore, for example, it is difficult to allocate the CPU to processes other than target detection. In this respect, there is a room for improvement.

Also, in the target detecting method according to the comparative example, as shown in FIG. 1A, if a high load state occurs (see E1 of FIG. 1A), for example, if the processing time lengthens in the loop of the n-th process (wherein n is a certain natural number), the subsequent-stage processes are stopped.

Specifically, a target data group based on measurement values of the latest cycle is discarded (STEP S1'), and skipping to a target data group obtained by new scanning is performed (STEP S2') without transitioning to the subsequent-stage processes which are the (n+1)-th process and the subsequent processes. Also, since the target data group of the latest cycle is discarded in STEP S1', with respect to targets detected until the previous cycle, in the latest cycle, extrapolation, i.e., interpolation using estimate values based on the previous values is performed.

Therefore, according to the target detecting method of the comparative example, in order to get out of the high load state, i.e. in order to secure the processing performance, the subsequent-stage processes are stopped. As a result, the target detection accuracy decreases. In this respect, there is a room for improvement.

For this reason, in the target detecting method according to the present embodiment, in the case where the number of times the loop of each process of the signal processing procedure should be repeated is variable, if a high load state occurs in each process, in order to get out of the high load state, processing object data is selected and the number of times each loop should be repeated is changed such that the subsequent-stage processes are not stopped.

Figure 1B:
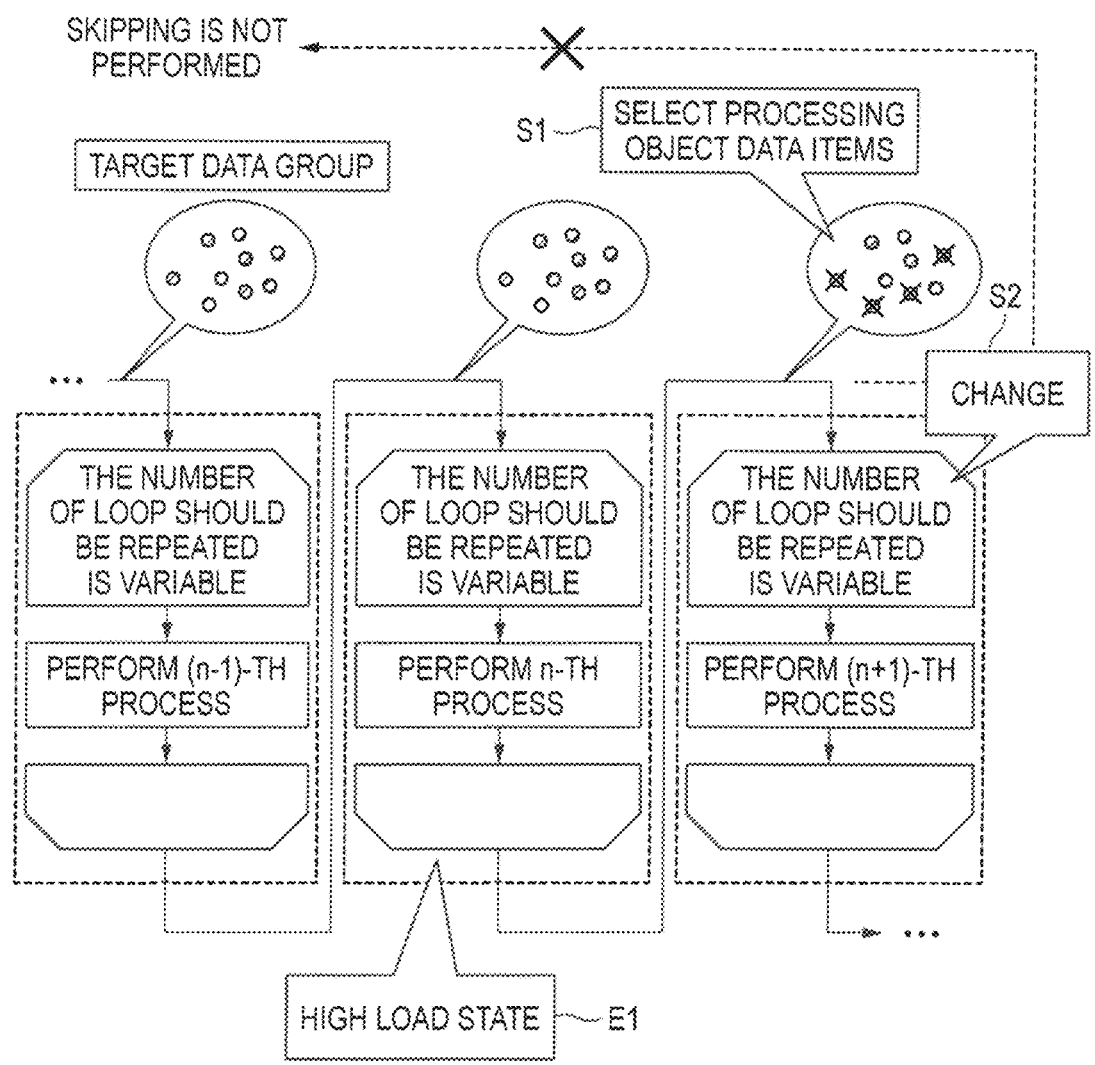
FIG. 1B is a view for explaining an overview of a target detecting method according to an embodiment.

Specifically, as shown in FIG. 1B, the target detecting method according to the present embodiment uses a control structure in which the number of times the loop of each of the (n−1)-th process, the n-th process, and the (n+1)-th process should be repeated is variable. Also, in the initial state of one cycle of the signal processing procedure, the number of times of the loop of each process should be repeated is set to a default value.

Thereafter, for example, if a high load state occurs in the loop of the n-th process (see E1 of FIG. 1B), the target detecting method according to present embodiment reduces the number of processing object data items such that a high load state is prevented from occurring in the subsequent-stage processes which are the (n+1)-th process and the subsequent processes. In other words, in the target detecting method according to the present embodiment, after the n-th process, processing object data items to be transferred to the (n+1)-th process are selected from the target data group (STEP S1).

Also, according to the number of selected processing object data items, the number of times the loop of each of the (n+1)-th process and the subsequent processes should be repeated is changed (STEP S2). In other words, the processing conditions for the subsequent-stage processes are changed.

Therefore, in the target detecting method according to the present embodiment, as shown by a description "SKIPPING IS NOT PERFORMED" in FIG. 1B, in the middle of the signal processing procedure, a process of discarding target data to skip to a target data group obtained by new scanning is not performed. Therefore, it is possible to reduce targets to be extrapolated while reducing the number of processing object data items. Therefore, it is possible to improve the detection accuracy while securing the processing performance.

In STEP S1, processing object data items are selected on the basis of a predetermined selection condition. As a selection condition for each of the (n−1)-th process, the n-th process, and the (n+1)-th process, a condition depending on the content of the corresponding process is set, and each selection condition includes, for example, the priorities of processing object data items to be selected. The priorities of target data items are determined in advance, for example, in view of the importance and accuracy of them, such that it is possible to secure the detection accuracy of final targets subjected to the subsequent-stage processes. Specific examples of the selection conditions will be described below with reference to FIG. 6A and so on.

As described above, in the present embodiment, when the processes of the signal processing procedure are sequentially performed, if it is detected from the processing state of a certain process that corresponding process is in a high load state, the processing condition for the subsequent-stage processes of the corresponding process is changed according to the processing state.

In other words, in the present embodiment, if it is detected that the n-th process of the loops in a high load state, the number of processing Object data items for the (n+1)-th process and the subsequent processes is reduced, and processing object data items to be transferred to the (n+1)-th process are selected. This selection is performed on the basis of a selection condition defined in advance according to the processing content of the n-th process.

Also, while the number of times of the loop of each of the (n+1)-th process and the subsequent-stage process should be repeated is changed according to the number of processing object data items reduced, the signal processing procedure of the latest cycle is performed to the end, without skipping. Therefore, according to the present embodiment, it is possible to improve the target detection accuracy while securing the processing performance.

Hereinafter, a radar device 1 using the above-described target detecting method will be described in more detail.

Figure 2:
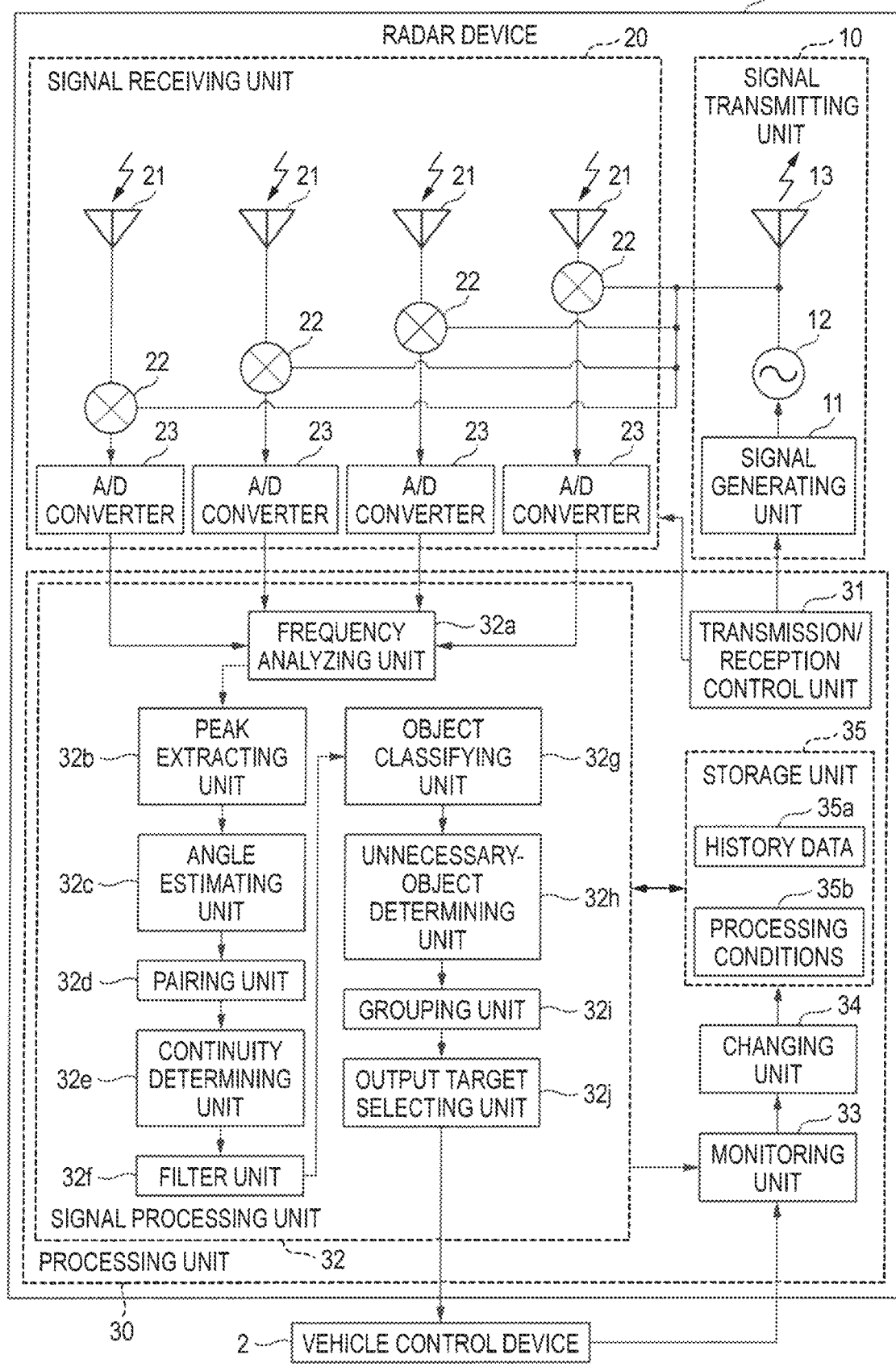
FIG. 2 is a block diagram illustrating a radar device according a first embodiment.

FIG. 2 is a block diagram illustrating a radar device 1 according to a first embodiment. Also, in FIG. 2, only components necessary to explain features of the present embodiment are shown as functional blocks, and general components are not shown.

In other words, the components shown in FIG. 2 are functionally conceptual, and do not need to have a physically configuration as shown in FIG. 2. For example, distribution or integration of the individual functional blocks is not limited to a specific mode shown in FIG. 2, and it is possible to distribute or integrate all or a part thereof functionally or physically in an arbitrary unit, depending on various loads, usage conditions, and so on.

As shown in FIG. 2, the radar device 1 includes a signal transmitting unit 10, a signal receiving unit 20, and a processing unit 30, and is connected to a vehicle control device 2 configured to control behavior of a vehicle MC (shown in FIG. 4A and so on) equipped with the radar device.

The vehicle control device 2 performs vehicle control on a pre-crash safety system (PCS), an AEB (Advanced Emergency Braking) system, and the like, on the basis of the results of target detection of the radar device 1. However, the radar device 1 may be used for various uses (such as monitoring of aircrafts and vessels) other than an in-vehicle radar device.

The signal transmitting unit 10 includes a signal generating unit 11, an oscillator 12, and a transmission antenna 13. The signal generating unit 11 generates modulation signals for transmitting frequency-modulated millimeter waves having a triangular waveform under control of a transmission/reception control unit 31 to be described below. The oscillator 12 generates transmission signals on the basis of the modulation signals generated by the signal generating unit 11, and outputs the transmission signals to the transmission antenna 13. As shown in FIG. 2, the transmission signals generated by the oscillator 12 are distributed even to mixers 22.

The transmission antenna 13 converts the transmission signals received from the oscillator 12 into transmission waves, and outputs the transmission waves to the outside of the vehicle MC. The transmission waves which are output from the transmission antenna 13 are frequency-modulated continuous waves having a triangular waveform. If the transmission antenna 13 transmits transmission waves to the outside of the vehicle MC, for example, forward from the vehicle, the transmission waves are reflected from targets of other vehicles and the like, thereby becoming reflected waves.

The signal receiving unit 20 includes a plurality of receiving antennae 21 forming an array antenna, the plurality of mixers 22, and a plurality of A/D converters 23. Pairs of the mixers 22 and the A/D converters 23 are provided in the receiving antennae 21, respectively.

The receiving antennae 21 receive the reflected waves from the targets, as reception waves, and convert the reception waves into reception signals, and output the reception signals to the mixers 22. Also, the number of receiving antennae 21 shown in FIG. 2 is four; however, it may be three or less, or five or more.

The reception signals output from the receiving antennae 21 are amplified by amplifiers (not shown in the drawings) (for example, low-noise amplifiers), and then are input to the mixers 22. The mixers 22 partially mix the distributed transmission signals and the reception signals received from the receiving antennae 21, thereby generating beat signals without unnecessary signal components, and output the beat signals to the A/D converters 23.

The beat signals are the differential waves between the transmission waves and the reception waves, and have beat frequencies which are the differences between the frequencies of the transmission signals (hereinafter, referred to as transmission frequencies) and the frequencies of the reception signals (hereinafter, referred to as reception frequencies). The beat signals generated in the mixers 22 are converted into digital signals in the A/D converters 23, and are output to the processing unit 30.

The processing unit 30 includes the transmission/reception control unit 31, a signal processing unit 32, a monitoring unit 33, a changing unit 34, and a storage unit 35. The signal processing unit 32 includes a frequency analyzing unit 32a, a peak extracting unit 32b, an angle estimating unit 32c, a pairing unit 32d, a continuity determining unit 32e, a filter unit 32f, an object classifying unit 32g, an unnecessary-object determining unit 32h, a grouping unit 32i, and an output target selecting unit 32j.

The storage unit 35 is for storing history data 35a and a processing condition 35b. The history data 35a is the history of target data used in the signal processing procedure performed in the signal processing unit 32. The processing condition 35b is parameter information related to the processing conditions for the individual processes of the signal processing procedure. Specific examples of the processing condition 35b will be described below with reference to FIG. 6A and so on.

The processing unit 30 is, for example, a microcomputer including a CPU, a ROM (Read Only Memory), a RAM (Random Access Memory), and registers corresponding to the storage unit 35, input/output ports, and so on, and controls the whole of the radar device 1.

The CPU of the microcomputer functions as the transmission/reception control unit 31, the signal processing unit 32, the monitoring unit 33, and the changing unit 34 by reading out programs from the ROM and executing the programs. All of the transmission/reception control unit 31, the signal processing unit 32, the monitoring unit 33, and the changing unit 34 may be configured with hardware such as an ASIC (Application Specific Integrated Circuit), an FPGA (Field Programmable Gate Array), and the like.

The transmission/reception control unit 31 controls the signal transmitting unit 10 including the signal generating unit 11, and the signal receiving unit 20. The signal processing unit 32 periodically performs the signal processing procedure. Now, components of the signal processing unit 32 will be described. In the following description, FIGS. 3 to 5G are appropriately used together.

Figure 3:
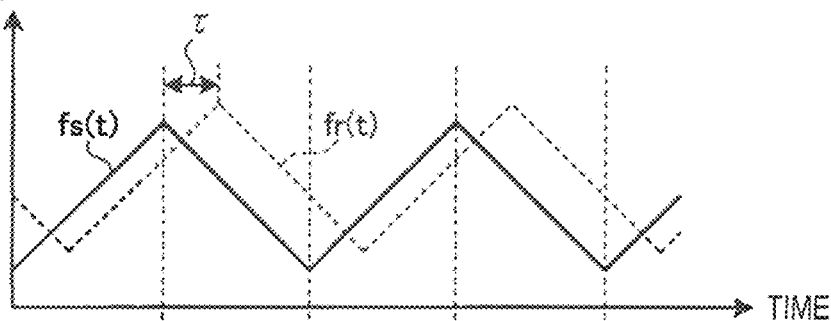
FIG. 3 is a view for explaining a procedure from a preliminary process for a signal processing unit to a peak extracting process of the signal processing unit.
Figure 3:
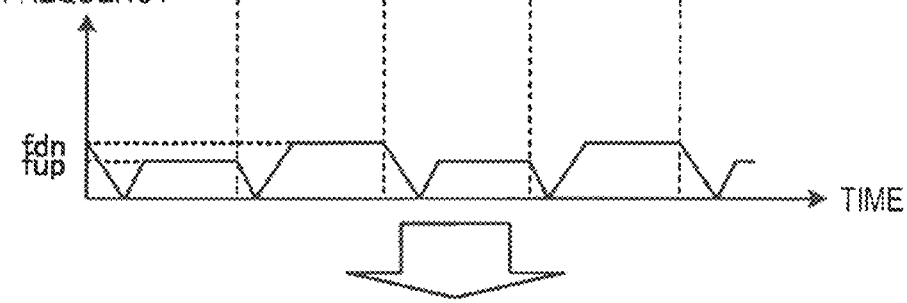
Figure 3:
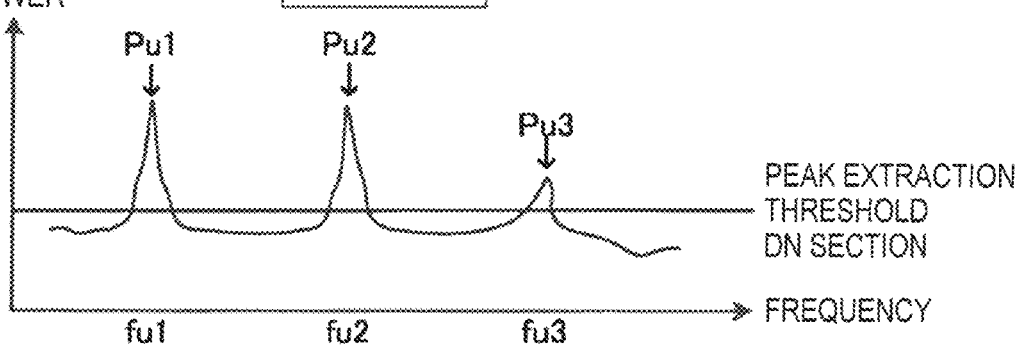
Figure 3:
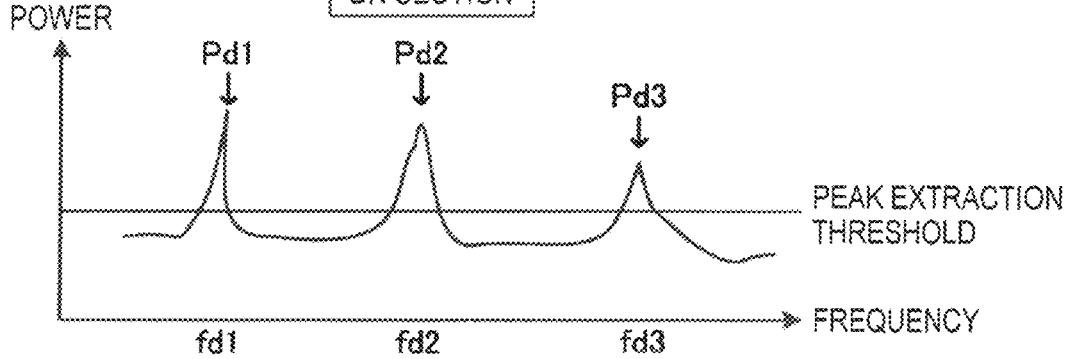
Figure 4A:
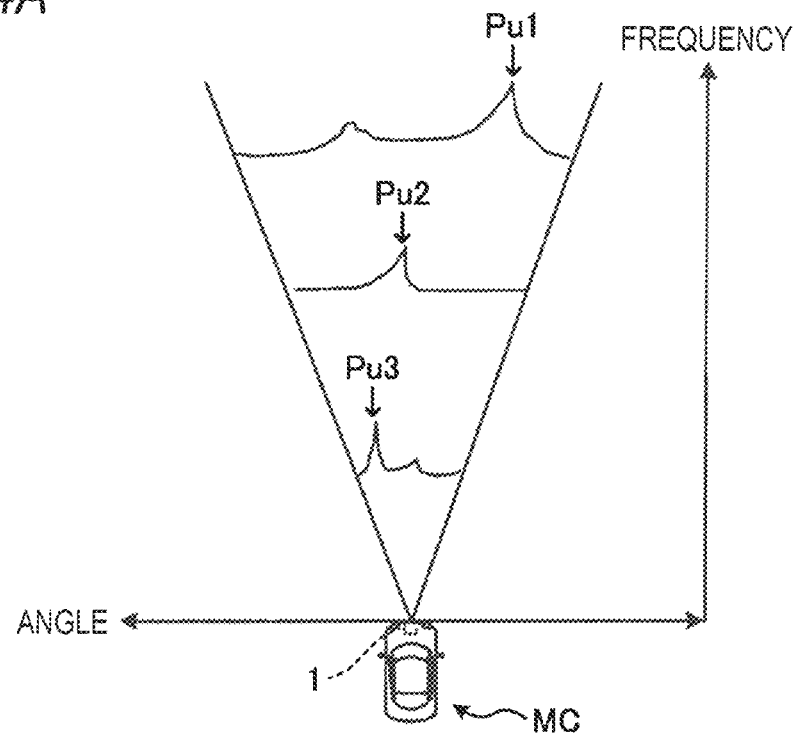
FIG. 4A is a view for explaining the procedure of an angle estimating process.
Figure 4B:
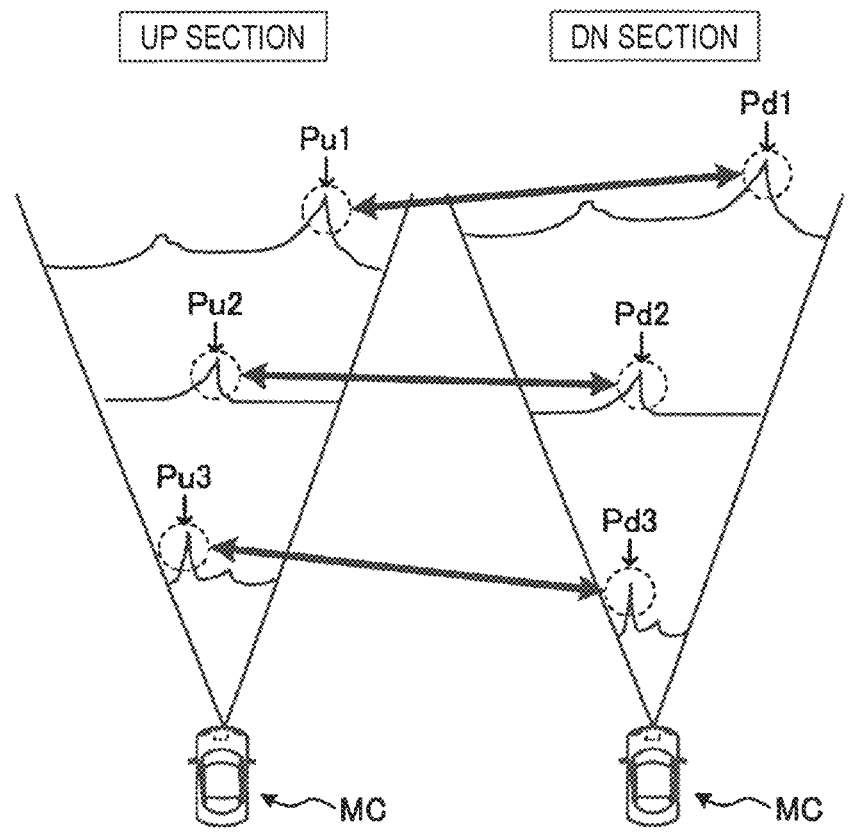
FIG. 4B is a view for explaining a first part of the procedure of a pairing process.
Figure 4C:
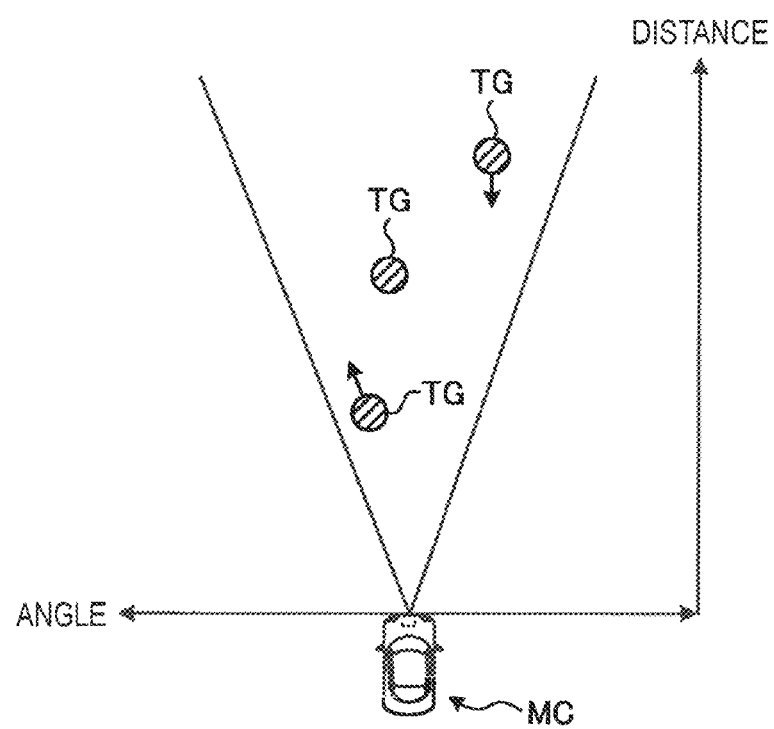
FIG. 4C is a view for explaining a second part of the procedure of the pairing process.

FIG. 3 is a view for explaining a procedure from a preliminary process for the signal processing unit 32 to a peak extracting process of the signal processing unit 32. FIG. 4A is a view for explaining the procedure of an angle estimating process. FIGS. 4B and 4C are views for explaining a first part and a second part of the procedure of a pairing process, respectively.

Figure 5A:
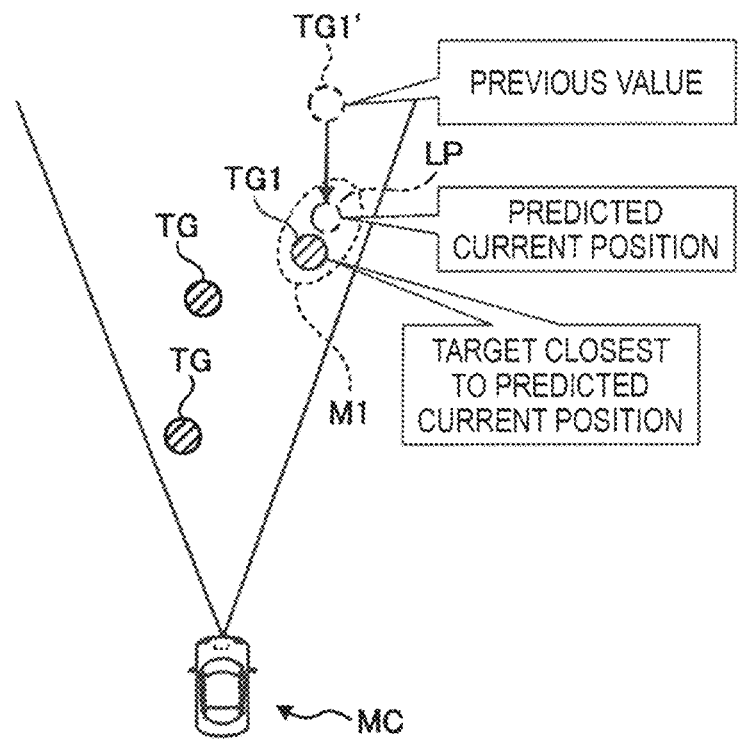
FIG. 5A is a view for explaining the procedure of a continuity determining process.
Figure 5B:
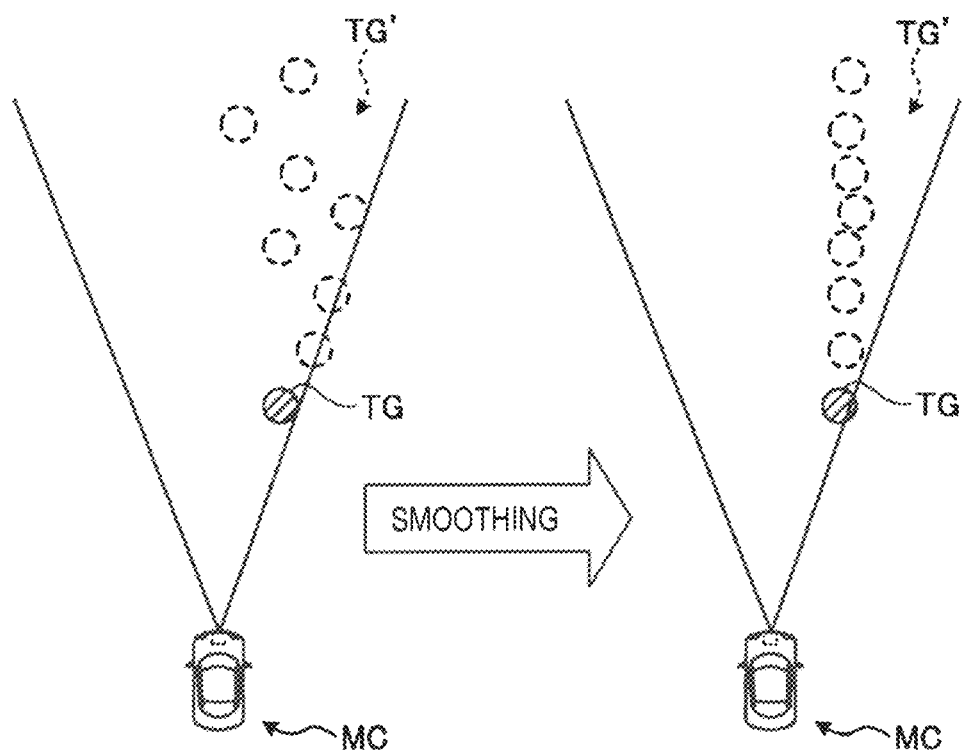
FIG. 5B is a view for explaining the procedure of a filtering process.
Figure 5C:
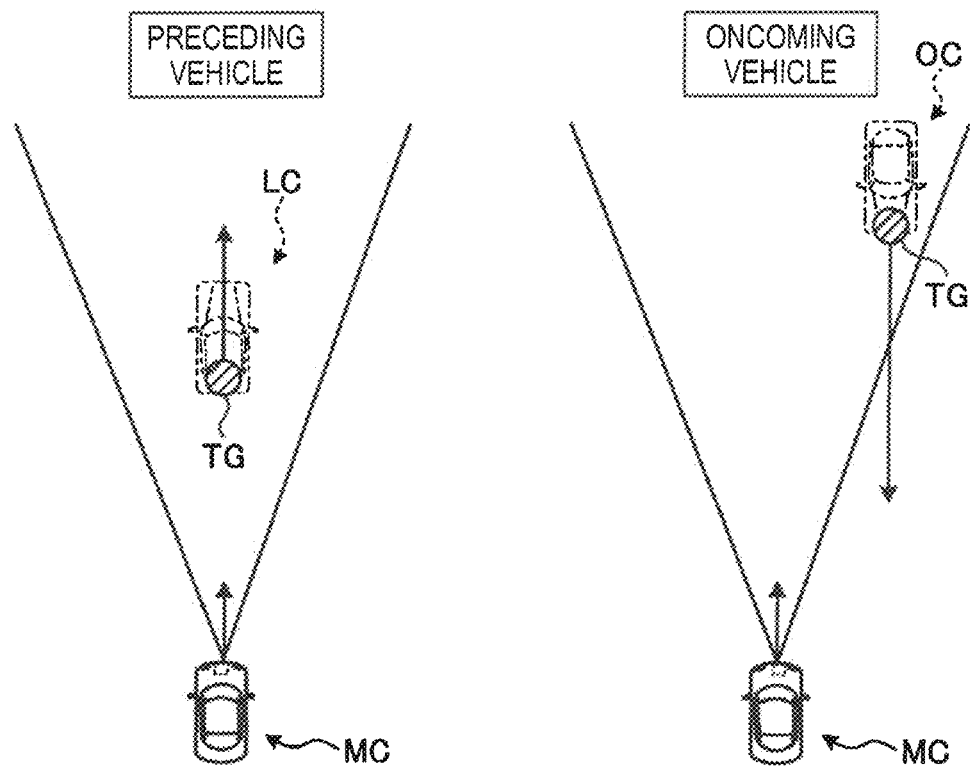
FIG. 5C is a view for explaining a first part of the procedure of an object classifying process.
Figure 5D:
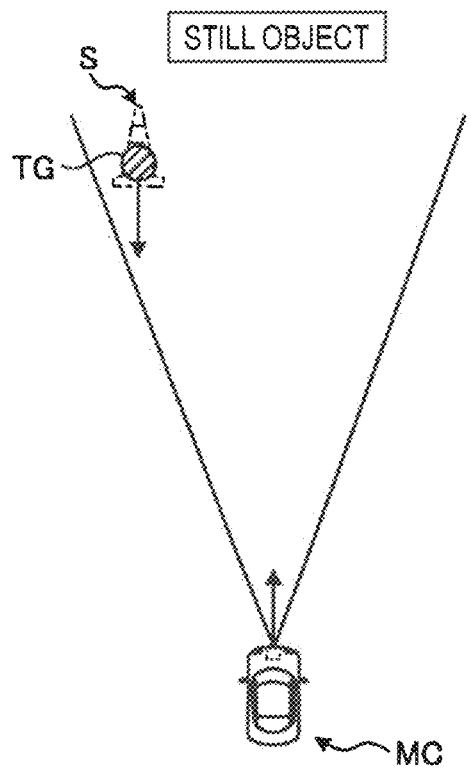
FIG. 5D is a view for explaining a second part of the procedure of the object classifying process.
Figure 5E:
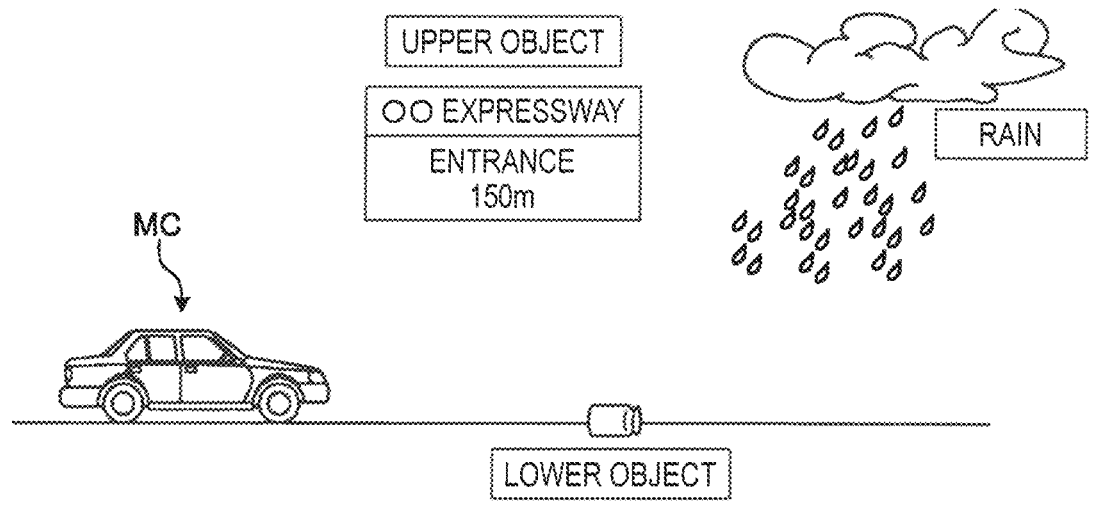
FIG. 5E is a view for explaining the procedure of an unnecessary-object determining process.
Figure 5F:
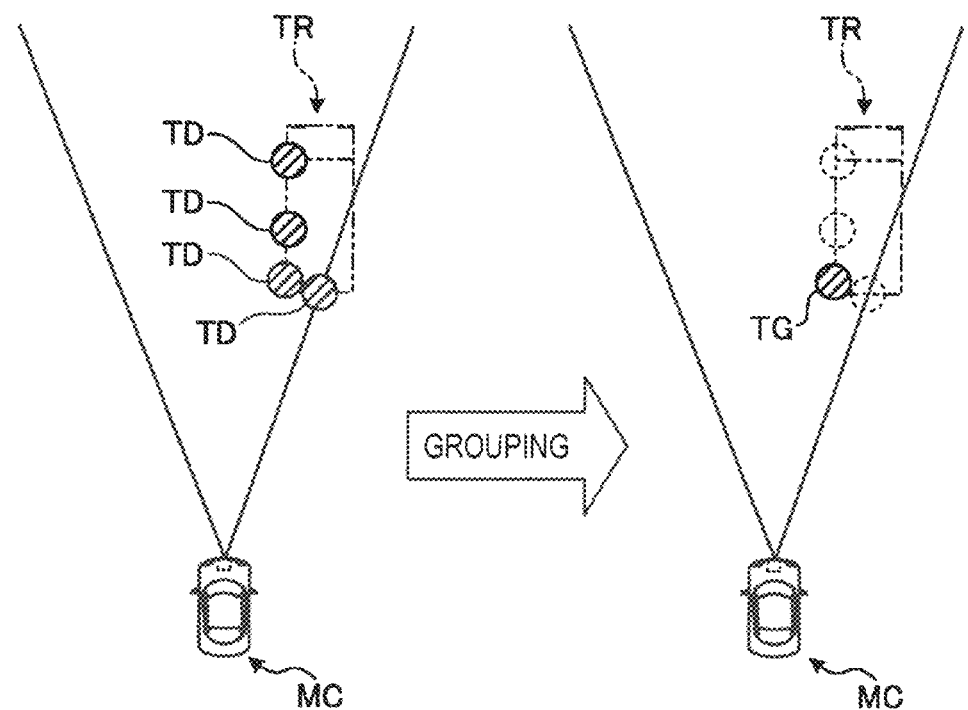
FIG. 5F is a view for explaining the procedure of a grouping process.
Figure 5G:
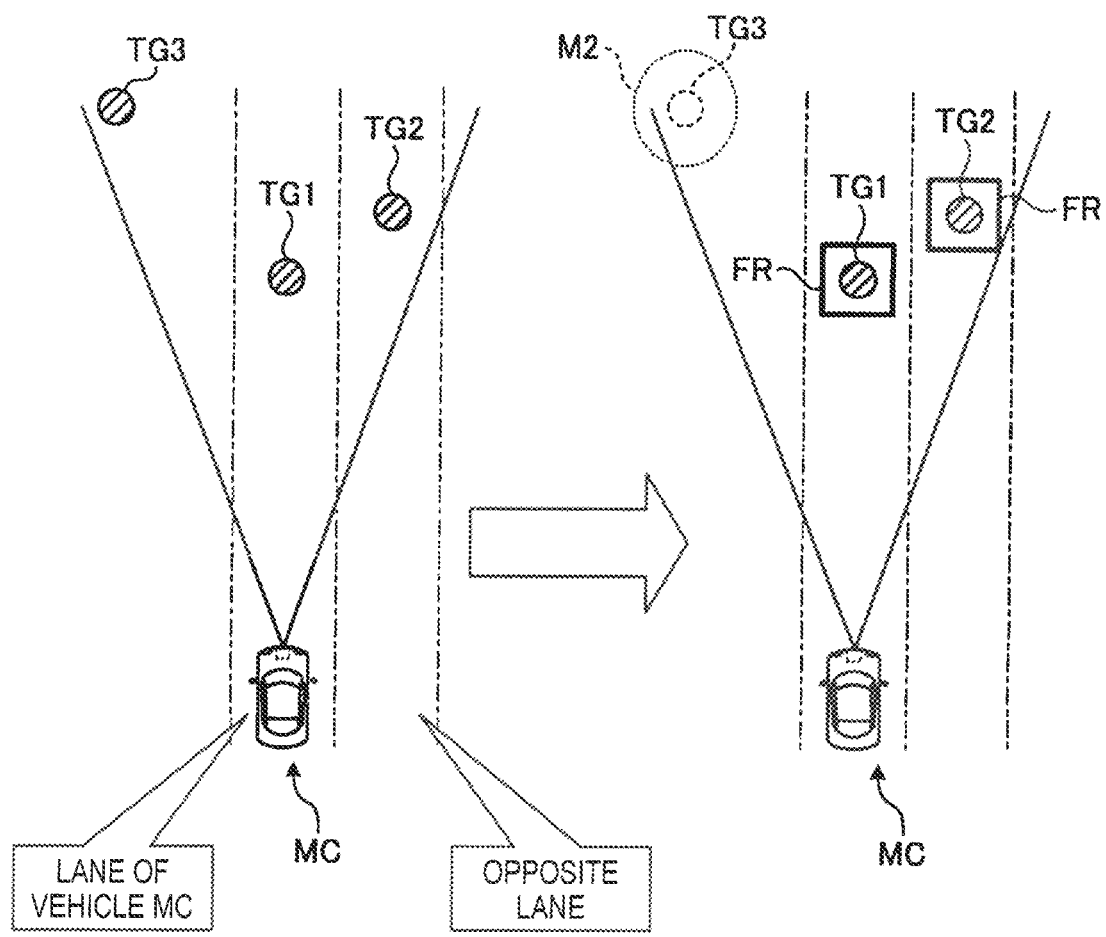
FIG. 5G is a view for explaining the procedure of an output target selecting process.

FIG. 5A is a view for explaining the procedure of a continuity determining process. FIG. 5B is a view for explaining the procedure of a filtering process. FIGS. 5C and 5D are views for explaining a first part and a second part of the procedure of an object classifying process. FIG. 5E is a view for explaining the procedure of an unnecessary-object determining process. FIG. 5F is a view for explaining the procedure of a grouping process. FIG. 5G is a view for explaining the procedure of an output target selecting process.

The frequency analyzing unit 32a performs a fast Fourier transform (FFT) process (hereinafter, referred to as an FFT process) on each of the beat signals received from the A/D converters 23, and outputs the result to the peak extracting unit 32b. The result of the FFT process on a beat signal is the frequency spectrum of the beat signal, and represents the power value (signal level) of the beat signal at each frequency (at each of frequency bins set at intervals of a frequency according to frequency resolution).

The peak extracting unit 32b extracts peak frequencies of peaks from the results of the FFT processes of the frequency analyzing unit 32a, and reflects the corresponding information in target data, and outputs the target data to the angle estimating unit 32c. The peak extracting unit 32b extracts the peak frequencies in the UP sections and DN sections of the beat signals (to be described below).

The angle estimating unit 32c calculates the incident angles and power values of the reflected waves corresponding to the peak frequencies extracted in the peak extracting unit 32b. At this moment, the incident angles are angles assumed to be angles at which targets exist, and hereinafter will be referred to as estimate angles. Also, the angle estimating unit 32c reflects the calculated estimate angles and the calculated power values in the target data, and outputs the target data to the pairing unit 32d.

On the basis of the calculation results of the angle estimating unit 32c, the pairing unit 32d determines correct pairs of peak frequencies of the UP sections and the DN sections, and calculates the distance and relative velocity of each target from the pairing results. Also, the pairing unit 32d reflects the estimate angles, distances, and relative velocities of the targets in the target data, and outputs the target data to the continuity determining unit 32e.

The flow of the procedure from the preliminary process for the signal processing unit 32 to the above-described processes of the signal processing unit 32 is shown in FIGS. 3 to 4C. Also, FIG. 3 has three areas divided by two white bold down arrows. Those areas hereinafter will be referred to as an upper part, a middle part, and a lower part in the order of them.

As shown in the upper part of FIG. 3, after a transmission signal fs(t) is transmitted as a transmission wave from the transmitting antennae 13, if the reflected wave of the transmission wave from a target reaches the radar device, the reflected wave is received as a reception signal fr(t) by each receiving antenna 21.

In this case, as shown in the upper part of FIG. 3, with respect to the transmission signal fs(t), the reception signal fr(t) has a time lag according to the distance between the vehicle MC and the target. Due to the Doppler effect based on the relative velocity between the vehicle MC and the target, as a beat signal, a signal in which the frequency fup of UP sections in which the frequency increases and the frequency fdn of DN sections in which the frequency decreases are repeated is obtained (see the middle part of FIG. 3).

The frequency analyzing unit 32a performs an FFT process on the heat signal, and the UP sections and the DN sections of the result of the FFT process are schematically shown in the lower part of FIG. 3.

In the frequency domain, the UP sections and the DN sections of the result of the FFT process have waveforms as shown in the lower part of FIG. 3. From those waveforms, the peak extracting unit 32b extracts peak frequencies of peaks.

For example, in the example shown in the lower part of FIG. 3, with reference to a peak extraction threshold, in the UP sections, peaks Pu1 to Pu3 are determined as peaks, and the peak frequencies fu1 to fu3 thereof are extracted.

Also, in the DN sections, similarly, with reference to the peak extraction threshold, peaks Pd1 to Pd3 are determined as peaks, and the peak frequencies fd1 to fd3 thereof are extracted.

In this case, some peak frequencies extracted by the peak extracting unit 32b may include frequency components corresponding to reflected waves from a plurality of targets. For this reason, the angle estimating unit 32c performs azimuth calculation with respect to each of the peak frequencies, thereby analyzing whether a target corresponding to the corresponding peak frequency exists.

The angle estimating unit 32c can perform the azimuth calculation using a well-known incidence direction estimating method such as ESPRIT (Estimation of Signal Parameters via Rotational Invariance Techniques).

FIG. 4A is a view schematically illustrating the result of the azimuth calculation of the angle estimating unit 32c. From the peaks Pu1 to Pu3 of the azimuth calculation results, the angle estimating unit 32c calculates estimate angles of targets corresponding to the peaks Pu1 to Pu3, respectively. Also, the magnitudes of the peaks Pu1 to Pu3 are handled as power values. The angle estimating unit 32c performs the azimuth calculating process on each of the UP sections and the DN sections, as shown in FIG. 4B.

Then, on the basis of the azimuth calculation results of the angle estimating unit 32c, the pairing unit 32d performs pairing such that a peak of an UP section and a peak of a DN section constituting each pair have similar estimate angles and similar power values, as shown in FIG. 4B. Also, on the basis of the pairs of peaks, the pairing unit 32d calculates the distance and relative velocity of each of targets TG corresponding to the pairs of peaks.

The distance of each target can be calculated on the basis of the following relationship: [Distance]∝(fup+fdn). The relative velocity of each target can be calculated on the basis of the following relationship: [Velocity]∝(fup−fdn). As a result, as shown in FIG. 4C, pairing results representing the estimate angles, distances, and relative velocities of the individual targets TG with respect to the vehicle MC are obtained.

Now, the continuity determining unit 32e will be described. The continuity determining unit 32e performs determination on temporal continuity between target data detected by the previous scanning and the target data obtained in the latest cycle (by the current scanning), and reflects the result in the target data, and outputs the target data to the filter unit 32f.

Specifically, as shown in FIG. 5A, in the case where a target TG1' has been detected by the previous scanning, the continuity determining unit 32e calculates a predicted current position LP on the basis of the previous values corresponding to the target TG' such as the previous position and the previous velocity. Then, the continuity determining unit 32e determines a target TG which is one of the determination object targets TG obtained by the current scanning and is closest to the predicted current position LP, as a target TG1 having temporal continuity with respect to the target TG1' detected in the past.

Now, the filter unit 32f will be described. The filter unit 32f performs a filtering process of smoothing the target data in the time axis direction, and reflects the result in the target data, and outputs the target data to the object classifying unit 32g.

FIG. 5B is a view schematically illustrating the filtering process which is performed in the filter unit 32f. Specifically, as shown in FIG. 5B, in the filtering process, the filter unit performs a process of smoothing current targets predicted on the basis of targets TG' detected in the past and determined as having continuity and current targets TG, i.e. a process of averaging a plurality of instantaneous value data items obtained by a plurality of times of scanning. As a result, variation of instantaneous value data is suppressed, and the detection accuracy of the targets TG is improved.

Now, the object classifying unit 32g will be described. The object classifying unit 32g performs an object classifying process of classifying the target data by types, and reflects the result in the target data, and outputs the target data to the unnecessary-object determining unit 32h.

FIGS. 5C and 5C are views schematically illustrating examples of classification which is performed in the object classifying unit 32g. As shown in FIG. 5C, for example, the object classifying unit 32g can classify some targets TG as moving objects such as preceding vehicles LC or oncoming vehicles OC.

Specifically, the object classifying unit 32g classifies a target TG having a relative velocity having a magnitude larger than that of the vehicle velocity of the vehicle MC and having the opposite direction to that of the vehicle velocity, as a preceding vehicle LC. Also, the object classifying unit 32g classifies a target TG having a relative velocity having a magnitude smaller than that of the vehicle velocity of the vehicle MC and having the opposite direction to that of the vehicle velocity, as an oncoming vehicle OC.

Also, as shown in FIG. 5D, for example, the object classifying unit 32g can classify some targets TG as still objects S. Specifically, the object classifying unit 32g classifies a target TG having a relative velocity having the direction almost opposite to that of the vehicle velocity, as a still object S.

Now, the unnecessary-object determining unit 32h will be described. The unnecessary-object determining unit 32h performs an unnecessary-object determining process of determining whether each target TG is unnecessary for system control, and reflects the result in the target data, and outputs the target data to the grouping unit 32i.

FIG. 5E is a view schematically illustrating an example of a target which is determined as an unnecessary target by the unnecessary-object determining unit 32h. As shown in FIG. 5E, the unnecessary-object determining unit 32h determines upper objects such as road signs, rain, and lower objects which do not obstruct the way of the vehicle MC, as unnecessary targets.

Other examples of unnecessary targets include structures, road reflection, wall reflection, wrapped ghosts, and the like. Basically, targets TG determined as unnecessary targets do not become output objects of the radar device 1. Therefore, it can be said that the priorities of target data items on unnecessary targets are low.

Now, the grouping unit 32i will be described. The grouping unit 32i performs a grouping process of integrating a plurality of target data items based on the same object into one, and reflects the result in the target data, and outputs the target data to the output target selecting unit 32j.

FIG. 5F is a view schematically illustrating the grouping process which is performed by the grouping unit 32i. Specifically, as shown in FIG. 5F, if some of the plurality of detected targets is assumed to be reflecting points of the same object (for example, a truck TR), the grouping unit 32i considers those targets as separate targets TD, and integrates them into one target TG. This grouping is performed, for example, on the basis of a condition that the detection positions of targets should be close and the velocities of the targets should be close.

Now, the output target selecting unit 32j will be described. The output target selecting unit 32j performs an output target selecting process of selecting targets TG which need to be output to the vehicle control device 2 for system control, and outputs target data on the selected targets TG to the vehicle control device 2.

FIG. 5G is a view schematically illustrating the output target selecting process which is performed in the output target selecting unit 32j. Basically, the output target selecting unit 32j preferentially selects targets TG detected from positions close to the vehicle MC in the lane of the vehicle MC.

Therefore, as shown in FIG. 5G, for example, in the case where a target TG1 has been detected from the lane of the vehicle MC, and a target TG2 has been detected from the opposite lane (or an adjacent lane), and a target TG3 has been detected from a position far from the lane of the vehicle MC, the output target selecting unit 32j does not select, for example, the target TG3 (see a part M2 of FIG. 5G).

In this case, the output target selecting unit 32j selects the target TG1 and the target TG2 assumed to be necessary in PCS or AEB (see frames FR of FIG. 5G). As described above, it can be said that the priority of the target TG far from the lane of the vehicle MC as target data is low.

Now, referring to FIG. 2 again, the monitoring unit 33 will be described. If the signal processing unit 32 sequentially performs the processes of the signal processing procedure, the monitoring unit 33 monitors the processing state of each process. Here, the processing state includes the processing time, and in the case where the processing time of a certain process exceeds a predetermined amount of time, the monitoring unit 33 detects that the corresponding process is in a high load state, and notifies the changing unit 34 that the corresponding process in the high load state.

When a certain process is in progress, if it is detected on the basis of the processing state of the corresponding process that the corresponding process is a high load state, the changing unit 34 changes the processing condition 35b for the subsequent-stage processes of the corresponding process, according to the processing state. Here, the subsequent-stage processes mean the subsequent processes of the process which is in the high load state.

For example, if the monitoring unit 33 detects that a certain process is in a high load state, on the basis of the processing state of the corresponding process, the changing unit 34 changes the processing condition 35b such that the number of target data items to be processing objects for the subsequent-stage processes becomes smaller than that in the corresponding process. In other words, the changing unit reduces the number of processing object data items.

Also, the signal processing unit 32 has a control structure for sequentially performing the processes of the signal processing procedure while repeating each process a certain number of times. The number of times each process should be repeated is variable (corresponding to a description "THE NUMBER OF LOOP SHOULD BE REPEATED IS VARIABLE" in FIG. 1B), and if the changing unit 34 reduces the number of processing object data items for the subsequent-stage processes, the signal processing unit 32 changes the number of times each loop should be repeated, according to the number of processing object data items reduced.

Also, the processing condition 35b includes target data selection conditions associated with the individual processes of the signal processing unit 32 according to the processing contents of the processes, and according to the selection condition for each process, the signal processing unit 32 selects target data items to be processing objects in the subsequent-stage processes.

Now, the case where it is detected that a certain process of the signal processing unit 32 is in a high load state will be described in more detail with reference to FIGS. 6A and 6B. FIG. 6A is a view illustrating an example of the processing condition 35b. Also, FIG. 6B is a view illustrating an example of change of the maximum number of processing objects.

As shown in FIG. 6A, for example, the processing condition 35b includes the process identifiers of the individual processes of the signal processing unit 32 registered in the order in which the processes are performed, and each process identifier is associated with a maximum number of processing objects and a condition for selecting processing object data items (here, a selection condition example).

In association with the number of times each loop should be repeated, the default value and current value of the maximum number of processing objects are set. The default value is the initial value of the number of times each loop should be repeated which is variable, and is updated whenever the signal processing procedure of the latest cycle starts, that is, whenever scanning is performed once.

Strictly, it is assumed that the individual process identifiers have different default values. However, here, for ease of explanation, a common default value "96" is used. In other words, in this example, this initial setting means that 96 target data items or less can be handled in each of the processes of the signal processing procedure which is performed when scanning is performed once.

As the current value associated with each process identifier, the number of times the loop of the corresponding process should be repeated in the current cycle is stored. With reference to those current values, the signal processing unit 32 performs the loop of the process of each process identifier the same number of times as the current value associated with the corresponding process.

Here, as shown in FIG. 6A, it is assumed that a high load state has occurred in the peak extracting process of the peak extracting unit 32b (see a star-shaped mark of FIG. 6A) and the monitoring unit 33 has detected that high load state. In this case, in response to the detection of the high load state, the changing unit 34 changes the current value associated with each process of the angle estimating process and the subsequent-stage processes which are subsequent-stage processes of the peak extracting process, for example, to "48" smaller than "96" which is the current value associated with the peak extracting process.

This change can be performed on the basis of the processing state. An example thereof is shown in FIG. 6B. For example, as shown in FIG. 6B, it is assumed that the maximum number of processing objects corresponding to a predetermined amount of time T which is a default value of the processing time is "96".

In this case, for example, if the monitoring unit 33 detects a high load state in which the processing time exceeds twice the predetermined amount of time T (see "2×T" of FIG. 6B), as shown in FIG. 6B, the changing unit 34 changes the maximum number of processing objects to "48" which is the product of 96 and ½. Similarly, if the processing time exceeds three times the predetermined amount of time T, the changing unit 34 changes the maximum number of processing objects to "32", and if the processing time exceeds four times the predetermined amount of time T, the changing unit 34 changes the maximum number of processing objects to "24".

In this way, it is possible to reduce the number of processing object data items for the subsequent-stage processes, and the number of times the loop of each of the subsequent-stage processes should be repeated, in response to the high load state, and it is possible to enhance the possibility of performing the signal processing procedure to the end. In other words, this changing can be conductive to improving the detection accuracy of targets TG while securing the processing performance.

Also, if the number of processing object data items is reduced, processing object data items to be transferred to the subsequent-stage process are selected on the basis of the above-described selection condition. The selection condition includes, for example, priorities, and the priorities are defined in advance in view of the degrees of importance, accuracy, and necessity of the target data items, such that it is possible to secure the detection accuracy of final targets TG subjected to the subsequent-stage processes.

Specifically, as shown in FIG. 6A, as a selection condition example to be used in the ease where a high load state is detected in the peak extracting process, for example, a condition that target data items should be selected in order from a target data item corresponding to the highest signal level can be taken. The reason is that it is considered that the signal levels are important parameters usable to select target data items, at the stage where the peak extracting process has finished, and the higher the signal level is, the higher the accuracy is. Therefore, this selection condition can be conducive to improving the detection accuracy of targets TG.

Similarly, in association with the angle estimating process, a condition that target data items should be selected in order from a target closest to the front of the vehicle MC can be taken. The reason is that it is considered that as target data items usable for automatic follow-up or collision avoidance of the vehicle MC, target data items closer to the front of the vehicle MC are more useful. In the same light, in association with the pairing process, a condition that target data items should be selected in order from a target closest to the front of the vehicle MC, a condition that target data items should be selected in order from a target closest to the vehicle MC, a condition that target data items should be selected in order from the fastest target, or the like can be taken.

Also, in association with the continuity determining process, a condition that target data items should be selected in order from a target whose predicted current position is closest to the vehicle MC, or the like can be taken. The reason is that target data items corresponding to predicted current positions closer to the vehicle MC have higher degrees of accuracy. Also, in association with the filtering process, a condition that target data items should be selected in order from a target data item having survived for the longest time, or the like may be taken. The reason is that it is considered that target data items which has been held for longer times and on which extrapolation has been performed relatively small numbers of times until the latest cycle have higher degrees of accuracy. Therefore, these conditions can be conducive to improving the detection accuracy of targets TG.

Also, in association with the object classifying process, moving objects may priority over still objects. The reason is that it is considered that system control has more need of moving objects than still objects. In association with the unnecessary-object determining process, it is preferable to take a condition that target data items should be selected in order from targets corresponding to necessary objects. Needless to say; the reason is that the degrees of importance of unnecessary objects are low.

Also, in association with the grouping process, it is possible to take a condition that target data items should be selected in order from a target closest to the lane of the vehicle MC. The reason is that in the output target selecting process which is the subsequent process of the grouping process, basically, targets TG closer to the lane of the vehicle MC are preferentially selected.

Although the case of changing the number of times each loop should be repeated if the number of processing object data items is reduced has been described, only the number of processing object data items may be reduced. FIG. 6C is a view illustrating a first modification of selection of processing object data items.

As shown in FIG. 6C, for example, it is assumed the case where a high load state in which the number of extracted peaks exceeds the maximum number of processing objects occurs in the peak extracting process. In this case, for example, the same number of target data items as the number of processing object data items reduced by the excess may be selected according to the selection condition, and the selected target data items may be transferred to the angle estimating process, without changing the number of times each loop should be repeated. In other words, as long as the processing time falls in an allowable range even if the loop is repeated with respect to the maximum number of processing objects the number of times the loop should be repeated set to the default value, the number of processing object data items can be reduced.

Also, even though a high load state has not actually occurred, according to the surroundings, processing object data items may be selected in expectation of a high load state. FIG. 6D is a view illustrating a second modification of selection of processing object data items.

As shown by "IS VEHICLE IN URBAN AREA?", "IS VEHICLE IN TUNNEL?", AND "IS VEHICLE STUCK IN TRAFFIC?" in FIG. 6D, change of the surroundings, like an increase in the number of types of targets TG or an increase in the importance of PCS or AEB exists.

In this case, the radar device 1 may acquire information on the surroundings, for example, from the vehicle control device 2 (see an arrow from the vehicle control device 2 to the monitoring unit 33 in FIG. 2), and the monitoring unit 33 may determine whether occurrence of a high load state is expected on the basis of the surroundings (STEP S61).

In this case, if the determination result is "Yes", processing object data items may be selected to prepare for a high load state (STEP S62). This process of preventively selecting processing object data items as described above can be conducive to improving the target detection accuracy while securing the processing performance.

Figure 7A:
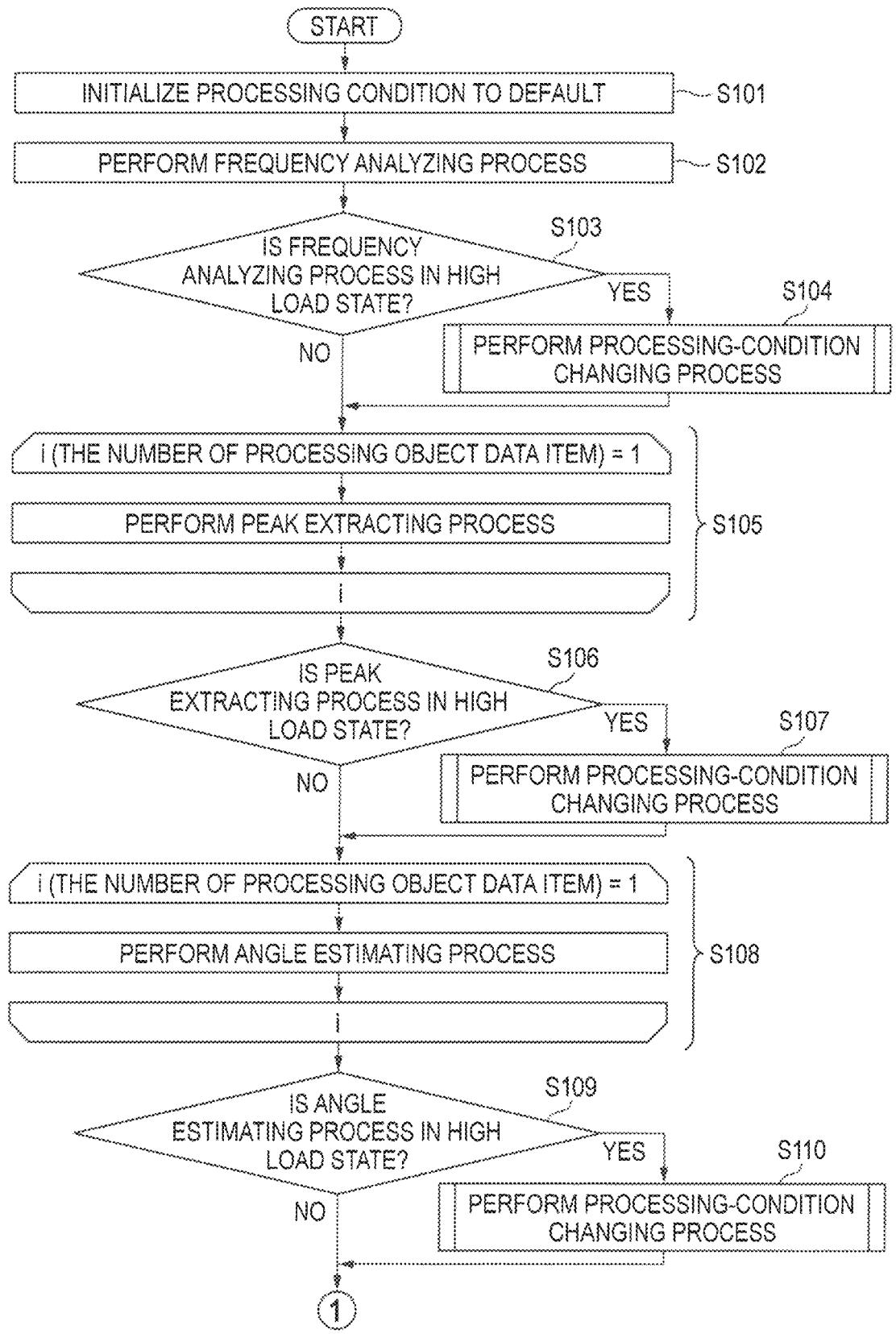
FIG. 7A is a flow chart illustrating a first part of a processing procedure which is performed in a processing unit of the radar device according to the first embodiment.

Now, the processing procedure which is performed in the processing unit 30 of the radar device 1 according to the present embodiment will be described with reference to FIGS. 7A to 8. FIGS. 7A to 7D are flow charts illustrating first to fourth parts of the processing procedure which is performed in the processing unit 30 of the radar device 1 according to the present embodiment, respectively. Also, FIG. 8 is a flow chart illustrating the processing procedure of the processing-condition changing process. FIGS. 7A to 8 show the signal processing procedure which is performed when scanning is performed once.

As shown in FIG. 7A, first, the signal processing unit 32 initializes the processing condition 35b to a default (STEP S101). Subsequently, the frequency analyzing unit 32a performs the frequency analyzing process (STEP S102). Next, the monitoring unit 33 determines whether the frequency analyzing process is in a high load state (STEP S103).

In the cases where it is determined that the frequency analyzing process is in a high load state ("Yes" in STEP S103), a processing-condition changing process is performed (STEP S104), and the processing procedure proceeds to STEP S105. The processing procedure of the processing-condition changing process will be described below. In the case where it is determined that the frequency analyzing process is in a high load state, in the processing-condition changing process, for example, only the process of reducing the number of processing object data items for the subsequent-stage processes and the number of times each loop should be repeated is performed. Meanwhile, in the case where the frequency analyzing process is not in a high load state ("No" in STEP S103), the processing procedure proceeds directly to STEP S105.

In STEP S105, the peak extracting unit 32b repeatedly performs the peak extracting process on the same number of processing object data items as the current value of the maximum number of processing objects defined in the processing condition 35b. In STEP S105, "i" represents the count value of a loop counter, and the same applies to the following description. Subsequently, the monitoring unit 33 determines whether the peak extracting process is in a high load state (STEP S106).

In the case where it is determined that the peak extracting process is in a high load state ("Yes" in STEP S106), a processing-condition changing process is performed (STEP S107), and the processing procedure proceeds to STEP S108. Meanwhile, in the case where it is determined that the peak extracting process is not in a high load state ("No" in STEP S106), the processing procedure proceeds directly to STEP S108.

In STEP S108, the angle estimating unit 32c repeatedly performs the angle estimating process the same number of times as the number of processing object data items defined in the processing condition 35b. Subsequently, the monitoring unit 33 determines whether the angle estimating process is in a high load state (STEP S109).

Figure 7B:
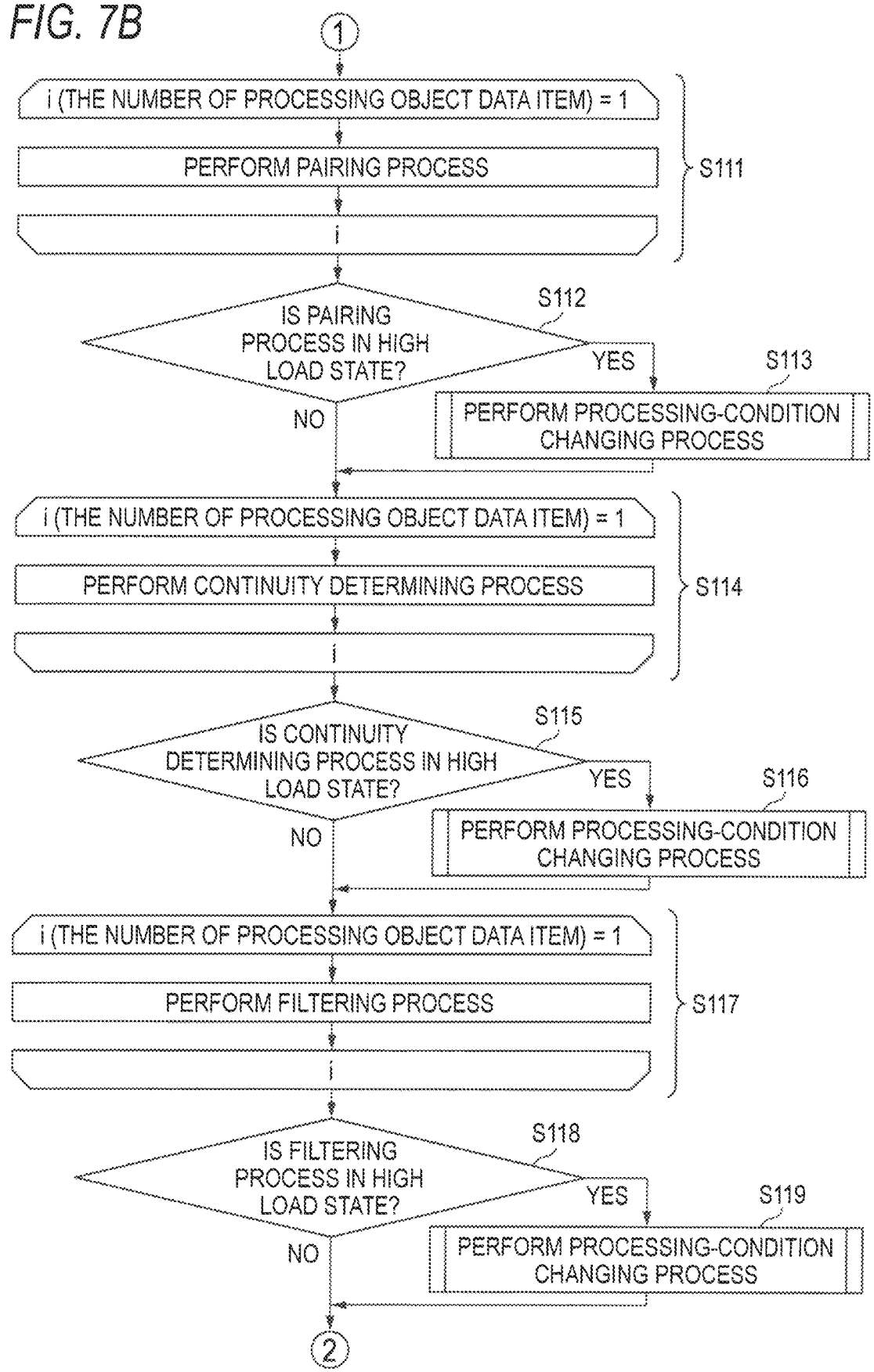
FIG. 7B is a flow chart illustrating a second part of the processing procedure which is performed in the processing unit of the radar device according to the first embodiment.
Figure 8:
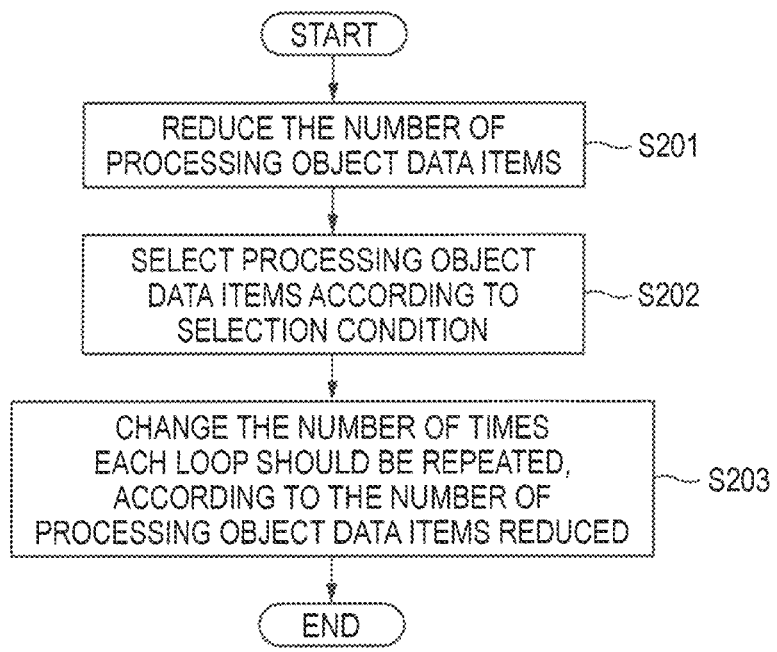
FIG. 8 is a flow chart illustrating the processing procedure of a processing-condition changing process.

In the case where it is determined that the angle estimating process is in a high load state ("Yes" in STEP S109), a processing-condition changing process is performed (STEP S110), and the processing procedure proceeds to STEP S111 of FIG. 7B. Meanwhile, in the case where it is determined that the angle estimating process is not in a high load state ("No" in STEP S109), the processing procedure proceeds directly to STEP S111 of FIG. 7B.

As shown in FIG. 7B, in STEP S111, the pairing unit 32d repeatedly performs the pairing process the same number of times as the number of processing object data items defined in the processing condition 35b. Subsequently, the monitoring unit 33 determines whether the pairing process is in a high load state (STEP S112).

In the case where it is determined that the pairing process is in a high load state ("Yes" in STEP S112), a processing-condition changing process is performed (STEP S113), and the processing procedure proceeds to STEP S114. Meanwhile, in the case where it is determined that the pairing process is not in a high load state ("No" in STEP S112), the processing procedure proceeds directly to STEP S114.

In STEP S114, the continuity determining unit 32e repeatedly performs the continuity determining process the same number of times as the number of processing object data items defined in the processing condition 35b. Subsequently, the monitoring unit 33 determines whether the continuity determining process is in a high load state (STEP S115).

In the case where it is determined that the continuity determining process is in a high load state ("Yes" in STEP S115), a processing-condition changing process is performed (STEP S116), and the processing procedure proceeds to STEP S117. Meanwhile, in the case where it is determined that the continuity determining process is not in a high load state ("No" in STEP S115), the processing procedure proceeds directly to STEP S117.

In STEP S117, the filter unit 32f repeatedly performs the filtering process the same number of times as the number of processing object data items defined in the processing condition 35b. Subsequently; the monitoring unit 33 determines whether the filtering process is in a high load state (STEP S118).

Figure 7C:
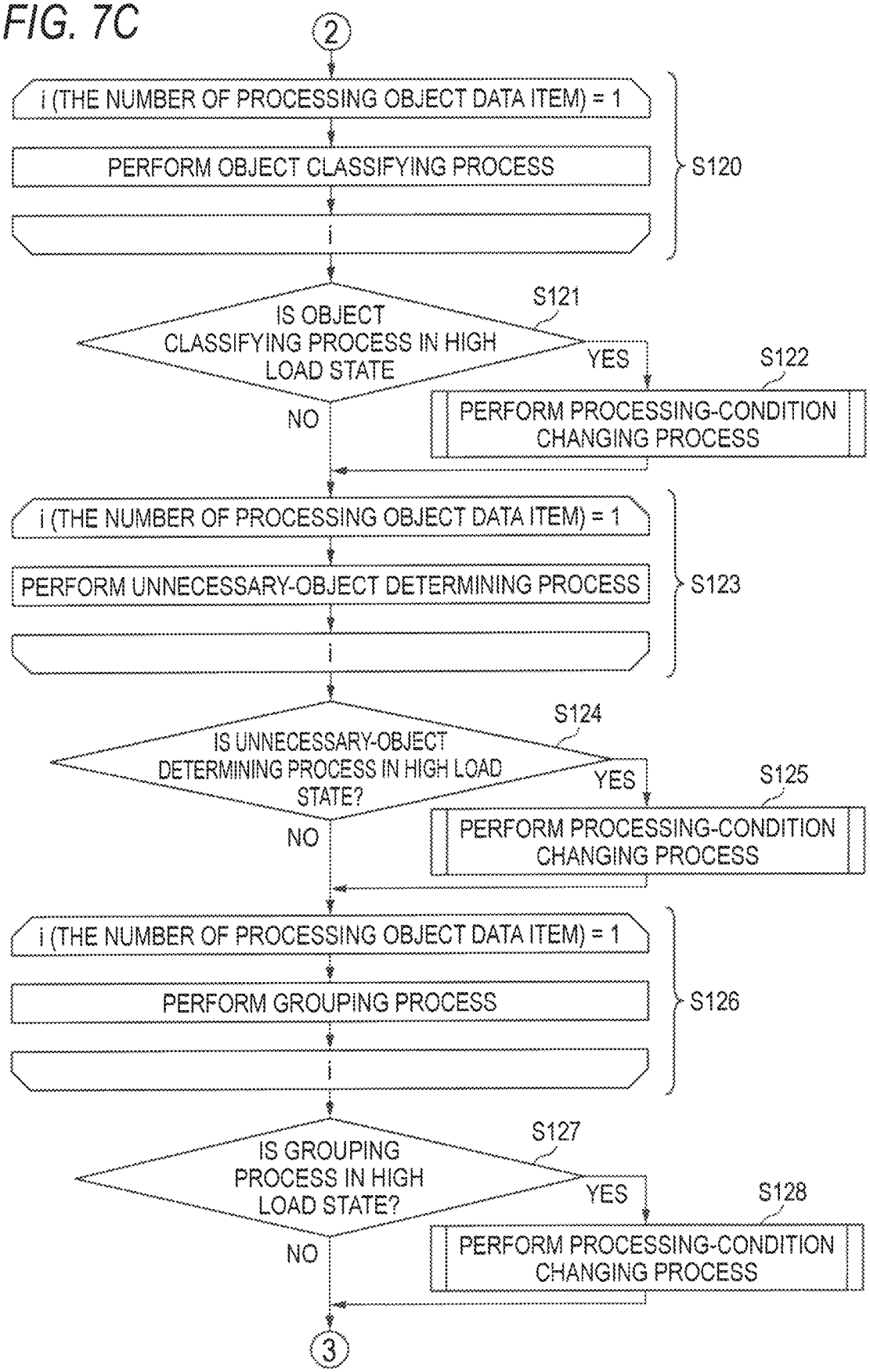
FIG. 7C is a flow chart illustrating a third part of the processing procedure which is performed in the processing unit of the radar device according to the first embodiment.

In the case where it is determined that the filtering process is in a high load state ("Yes" in STEP S118), a processing-condition changing process is performed (STEP S119), and the processing procedure proceeds to STEP S120 of FIG. 7C. Meanwhile, in the case where it is determined that the filtering process is not in a high load state ("No" in STEP S118), the processing procedure proceeds directly to STEP S120 of FIG. 7C.

As shown in FIG. 7C, in STEP S120, the object classifying unit 32g repeatedly performs the object classifying process the same number of times as the number of processing object data items defined in the processing condition 35b. Subsequently, the monitoring unit 33 determines whether the object classifying process is in a high load state (STEP S121).

In the case where it is determined that the object classifying process is in a high load state ("Yes" in STEP S121), a processing-condition changing process is performed (STEP S122), and the processing procedure proceeds to STEP S123. Meanwhile, in the case where it is determined that the object classifying process is not in a high load state ("No" in STEP S121), the processing procedure proceeds directly to STEP S123.

In STEP S123, the unnecessary object determining unit 32h repeatedly performs the unnecessary-object determining process the same number of times as the number of processing object data items defined in the processing condition 35b. Subsequently, the monitoring unit 33 determines whether the unnecessary-object determining process is in a high load state (STEP S124).

In the case where it is determined that the unnecessary-object determining process is in a high load state ("Yes" in STEP S124), a processing-condition changing process is performed (STEP S125), and the processing procedure proceeds to STEP S126. Meanwhile, in the case where it is determined that the unnecessary-object determining process is not in a high load state ("No" in STEP S124), the processing procedure proceeds directly to STEP S126.

In STEP S126, the grouping unit 32i repeatedly performs the grouping process the same number of times as the number of processing object data items defined in the processing condition 35b. Subsequently, the monitoring unit 33 determines whether the grouping process is in a high load state (STEP S127).

Figure 7D:
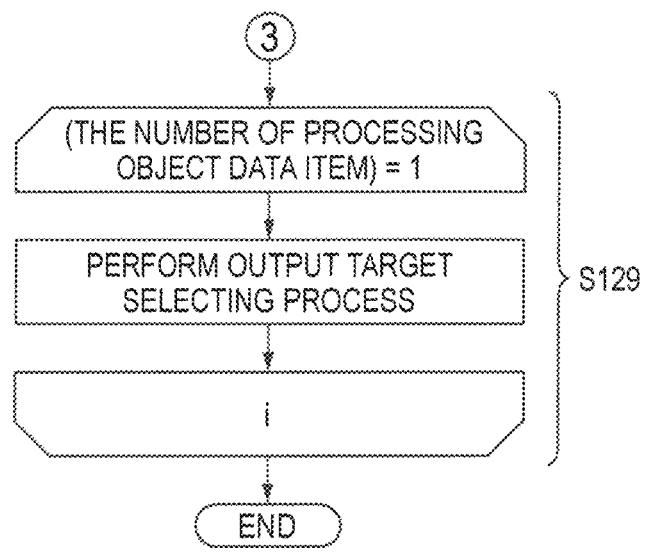
FIG. 7D is a flow chart illustrating a fourth part of the processing procedure which is performed in the processing unit of the radar device according to the first embodiment.

In the case where it is determined that the grouping process is in a high load state ("Yes" in STEP S127), a processing-condition changing process is performed (STEP S128), and the processing procedure proceeds to STEP S129 of FIG. 7D. Meanwhile, in the case where it is determined that the grouping process is not in a high load state ("No" in STEP S127), the processing procedure proceeds directly to STEP S129.

As shown in FIG. 7D, in STEP S129, the output target selecting unit 32j repeatedly performs the output target selecting process the same number of times as the number of processing object data items defined in the processing condition 35b. Then, the signal processing procedure corresponding to one scanning operation finishes.

Also, as shown in FIG. 8, in the processing-condition changing process, the changing unit 34 reduces the number of processing object data items, according to the processing state determined by the mode setting key group 113 (STEP S201). In other words, the changing unit changes the current value of the maximum number of processing objects included in the processing condition 35b.

Subsequently, the signal processing unit 32 selects processing object data items according to the selection condition of the processing condition 35b (STEP S202). Also, the signal processing unit 32 changes the number of times each loop should be repeated, according to the number of processing object data items reduced (STEP S203). Then, the processing-condition changing process finishes.

As described above, the radar device 1 according to the first embodiment is a radar device 1 for detecting targets TG by performing the signal processing procedure based on frequency-modulated continuous transmission waves and the reflected waves of the transmission waves from the targets TG, and includes the signal processing unit 32, the monitoring unit 33, and the changing unit 34.

The signal processing unit 32 periodically performs the signal processing procedure on the basis of beat signals the differential waves between the transmission waves and the reflected waves. The monitoring unit 33 monitors the processing state of each of the processes which are sequentially performed in the signal processing procedure. If the monitoring unit 33 detects that a certain process is in a high load state, on the basis of the processing state of the corresponding process, the changing unit 34 changes the processing condition for the subsequent-stage processes of the corresponding process, according to the processing state.

Therefore, according to the radar device 1 of the first embodiment, it is possible to improve the detection accuracy of targets TG while securing the processing performance.

Also, the processing state includes the processing time, and in the case where the processing time of a certain process of the signal processing procedure exceeds the predetermined amount of time T, the monitoring unit 33 detects that the corresponding process is in a high load state. Therefore, according to the radar device 1 of the first embodiment, it is possible to improve the detection accuracy of targets TG while securing the processing performance including the response performance.

Also, in the case where the monitoring unit 33 detects that a certain process is in a high load state, the changing unit 34 changes the processing condition 35b such that the number of target data items to be processing objects in the subsequent-stage processes becomes smaller than that in the corresponding process. Therefore, according to the radar device 1 of the first embodiment, in the subsequent-stage processes, it is possible to make the number of processing object data items at least smaller than that in the corresponding process which is in the high load state, thereby capable of reducing processing load. Therefore, it is possible to perform the signal processing procedure to the end without skipping. Therefore, it is possible to reduce the number of target data items to be extrapolated, and it is possible to improve the detection accuracy of targets TG while securing the processing performance.

Also, the signal processing unit 32 has a control structure for performing the signal processing procedure while performing the loop of each process the predetermined number of times, and if the changing unit 34 changes the processing condition 35b for the subsequent-stage processes, the number of times each loop should be repeated is changed according to the number of processing object data items.

Therefore, according to the radar device 1 of the first embodiment, it is possible to reduce, for example, the time for which each loop process occupies the CPU, and it is possible to allocate the CPU to processes other than target detection (for example, detection of misalignment of the axis of the radar and the like). In other words, it is possible to efficiently use the resources of the radar device 1, thereby capable of improving the processing performance.

Also, the processing condition 35b includes the target data selection conditions associated with the processes according to the processing contents of the processes, respectively, and the signal processing unit 32 selects target data items to be processing objects in the subsequent-stage processes, on the basis of the selection conditions. Therefore, according to the radar device 1 of the first embodiment, since the selection conditions are set such that even if the number of processing object data items is reduced, for example, target data items having higher degrees of importance and accuracy remain as processing object data items, the selection conditions can be conducive to efficiently performing target detection with high accuracy.

Also, since the signal processing unit 32 can perform the peak extracting process of extracting peaks having signal levels exceeding the predetermined threshold from the frequency spectra obtained by performing frequency analysis on beat signals, even if the monitoring unit 33 detects that the peak extracting process is in a high load state, the signal processing unit selects target data items under a selection condition that target data items corresponding to peaks having higher signal levels should be preferentially selected. Therefore, according to the radar device 1 of the first embodiment, even if the number of processing object data items for the subsequent-stage processes of the peak extracting process is reduced, in the subsequent-stage processes, it is possible to perform target detection based on peaks having high signal levels and high accuracy. In other words, it is possible to improve the detection accuracy of targets TG while securing the processing performance.

Also, since the signal processing unit 32 can perform the filtering process of smoothing individual elements included in target data in the time axis direction, if the monitoring unit 33 detects that the filtering process is in a high load state, the signal processing unit selects target data items under a selection condition that target data items having been held for longer times until the latest cycle should be preferentially selected. Therefore, according to the radar device 1 of the first embodiment, even if the number of processing object data items for the subsequent-stage processes of the filtering process is reduced, in the subsequent-stage processes, it is possible to perform target detection based on target data items having survived for longer times and having high accuracy. In other words, it is possible to improve the detection accuracy of targets TG while securing the processing performance.

Although the case where the radar device 1 is an FM-CW type has been described as an example, even in the case where a radar device is an FCM type, similarly, target data items for each process of the signal processing procedure may be selected according to the processing state. Hereinafter, this case will be described as a second embodiment.

Second Embodiment

Figure 9A:
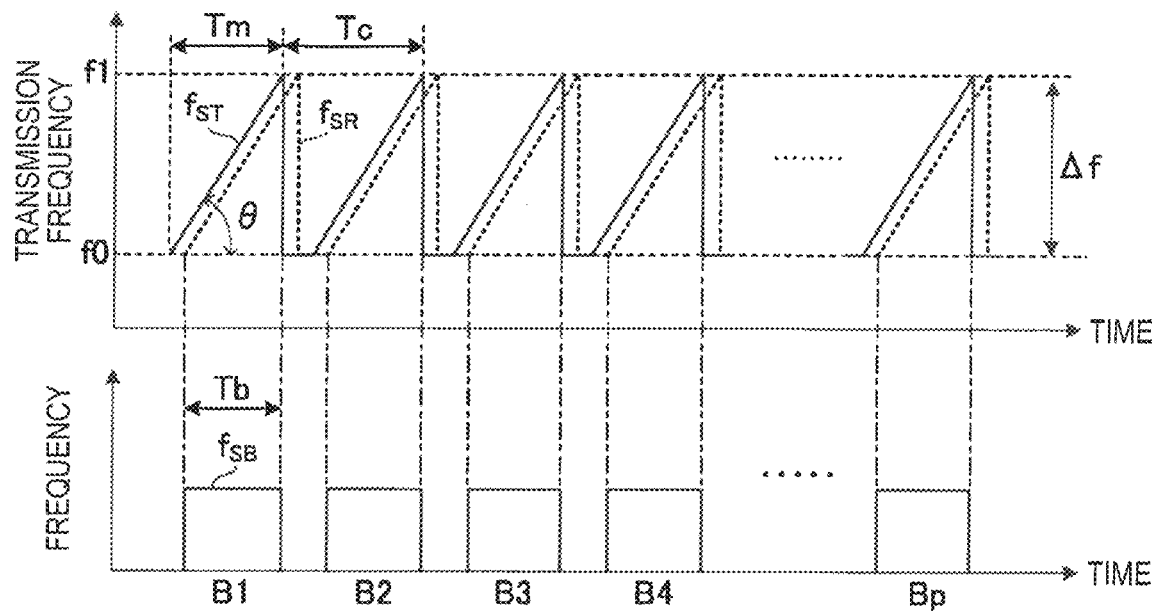
FIG. 9A is a view for explaining a first part of an overview of an FCM type according to a second embodiment.
Figure 9A:
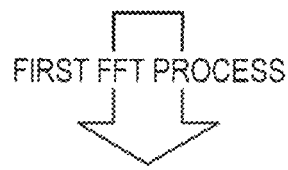
Figure 9A:
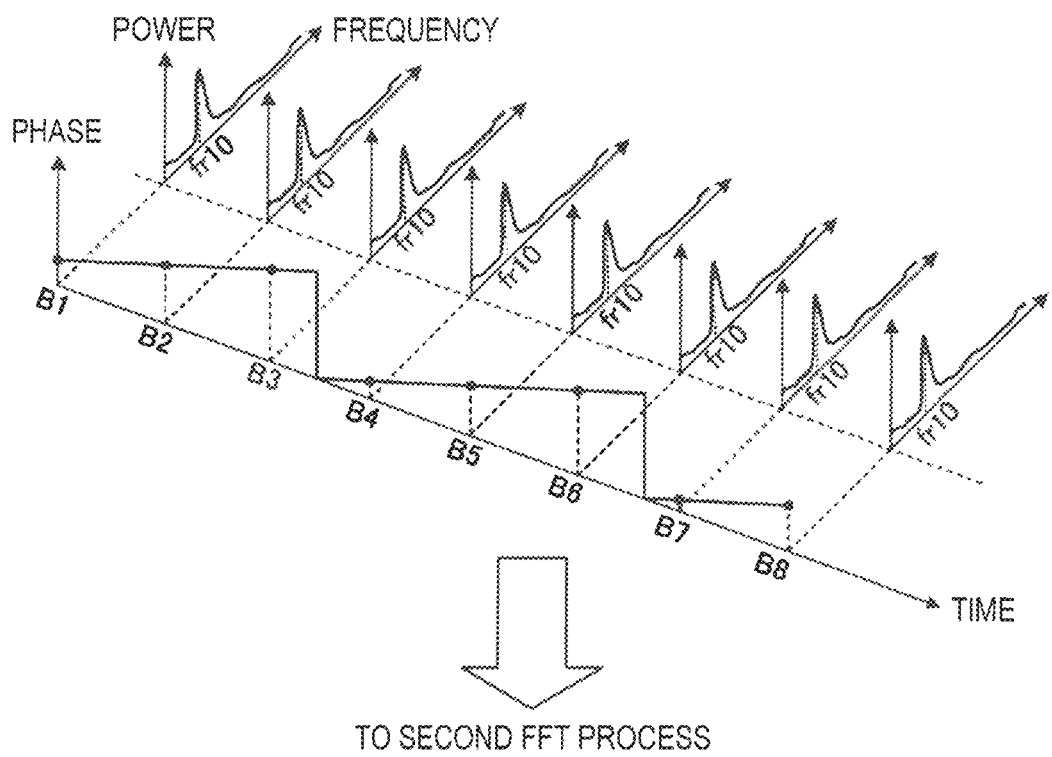
Figure 9B:
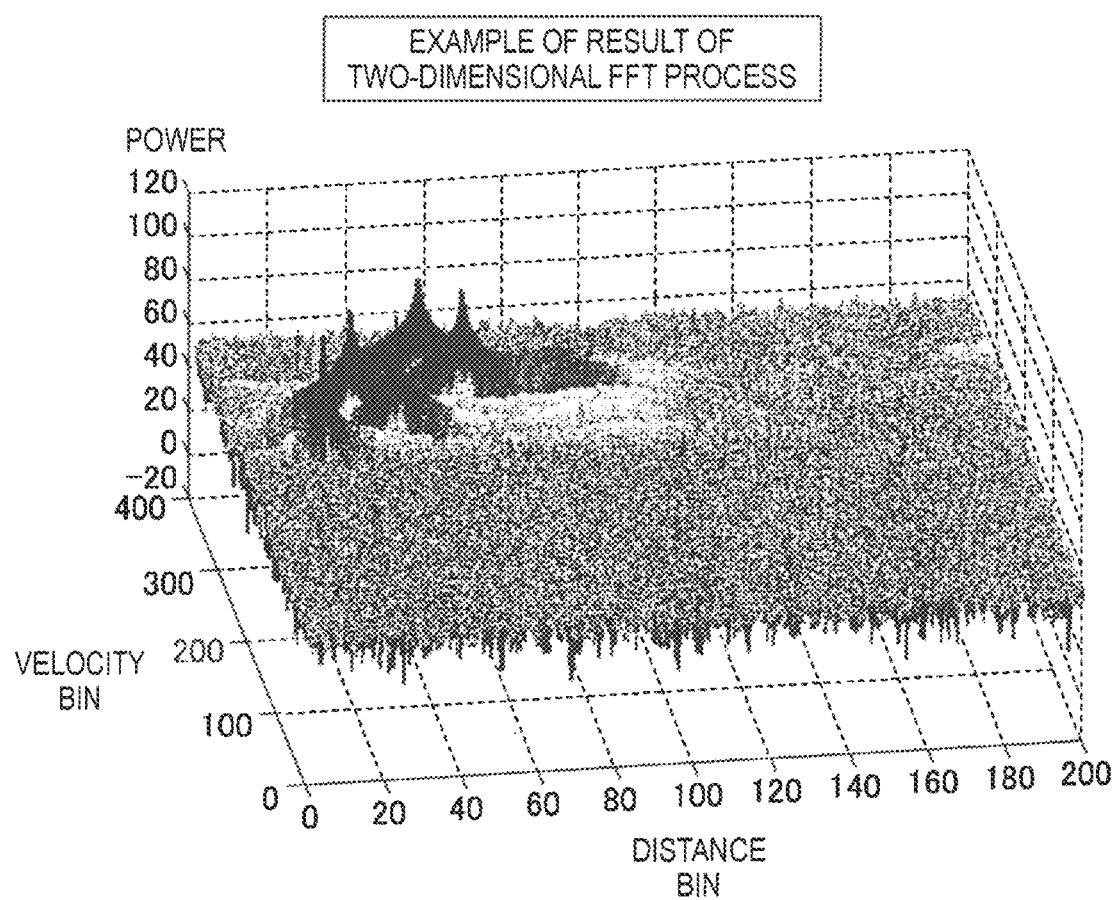
FIG. 9B is a view for explaining a second part of the overview of the FCM type according to a second embodiment.

First, an overview of the case where a radar device 1 is the FCM type will be described with reference to FIGS. 9A and 9B. FIGS. 9A and 9B are views for explaining a first part and a second part of the FCM type according to the second embodiment. Also, in the following description, FIG. 2 already described is also used.

The FCM type is a type for generating chirp waves in which the frequency continuously increases or decreases, as transmission signals, and receiving the reflected waves of the chirp waves from targets TG, as reception signals, and detecting the distances and velocities of the targets from changes in the frequencies and phases of beat signals generated from the transmission signals and the reception signals, and is superior to the FM-CW type in the velocity resolution.

In the FCM type, the signal generating unit 11 of the signal transmitting unit 10 (see FIG. 2) generates a modulation signal in which the voltage varies in a saw-tooth waveform, and supplies the modulation signal to the oscillator 12. The oscillator 12 generates transmission signals which are chirp signals in which that frequency increases as time goes on, with a predetermined period Tc (hereinafter, referred to as a chirp period Tc), on the basis of the modulation signal generated by the signal generating unit 11, and outputs the transmission signals to the transmission antenna 13.

The transmission antenna 13 converts the transmission signals received from the oscillator 12, into transmission waves, and outputs the transmission waves to the outside of the vehicle MC. The transmission waves which are output by the transmission antenna 13 are chirp waves in which the frequency increases with the chirp period Tc as time goes on.

The individual receiving antennae 21 of the signal receiving unit 20 (see FIG. 2) receive reflected waves from targets, as reception waves, and convert the reception waves into reception signals, and outputs the reception signals to the mixers 22. Similarly in the first embodiment, the mixers 22 partially mix the transmission signals and the reception signals, thereby generating beat signals without unnecessary signal components, and output the beat signals to the A/D converters 23. The A/D converters 23 convert the beat signals into digital signals, and then output the digital signals to the processing unit 30 (see FIG. 2).

In this way, the beat signals having heat frequencies $f_{SB}$ (=$f_{ST}$-$f_{SR}$) which are the differences between the transmission frequency $f_{ST}$ and the reception frequencies $f_{SR}$ are generated with respect to the chirp waves, respectively, as shown in the upper part of FIG. 9A. Also, here, a beat signal which is obtained by the first chirp wave is denoted by "B1", and a beat signal which is obtained by the second chirp wave is denoted by "B2", and a beat signal which is obtained by the p-th chirp wave is denoted by "Bp".

Also, in the example shown in the upper part of FIG. 9A, in each chirp wave, the transmission frequency $f_{ST}$ has a saw-tooth waveform in which the transmission frequency increases with an inclination θ (=(f1-f0)/Tm) from a reference frequency f0 with time, and if the transmission frequency reaches a maximum frequency f1, it returns to the reference frequency f0 in a short time. Also, modulation width Δf of chirp waves can be expressed as Δf=f1-f0.

Although not shown in the drawings, in each chirp wave, the transmission frequency $f_{ST}$ may have a saw-tooth waveform in which a transmission frequency reaches a maximum frequency f1 from the reference frequency f0 in a short time and decreases with an inclination θ (=(f1-f0)/Tm) from the maximum frequency f1 to the reference frequency f0 with time.

Further, in the FCM type, the frequency analyzing unit 32a performs a first FFT process on the individual beat signals generated as described above. Similarly in the first embodiment, the results of the first FFT process are the frequency spectra of the beat signals, and are the power values (signal levels) at the frequencies of the beat signals (at the frequencies set at intervals of a frequency according to the frequency resolution). Also, since the frequency bins of the results of the first FFT process correspond to the distances of the targets TG, they will also be referred to as distance bins fr. By specifying the distance bins fr at which the peaks exist, it is possible to detect the distances of the targets TG.

However, in the case where the relative velocity between a target TG and the radar device 1 is zero, since Doppler components do not occur in reception signals, and reception signals corresponding to individual chirp waves have the same phase, the phases of individual beat signals have the same phase. Meanwhile, in the case where the relative velocity between a target TG and the radar device 1 is not zero, since Doppler components occur in reception signals, and reception signals corresponding to individual chirp waves have different phases, between temporally consecutive beat signals, phase variation based on Doppler frequencies appears.

The middle part of FIG. 9B shows an example of the results of the first FFT process on temporally consecutive beat signals (B1 to B8) and phase variation in the peaks of the beat signals. This example shows that peaks exist at the distance bin fr10 and the phases of the peaks vary.

As described above, in the case where the relative velocity between a target TG and the radar device 1 is not zero, phase variation based on Doppler frequencies between beat signals appears at the peaks of beat signals corresponding to the same target TG. Therefore, frequency spectra having peaks at frequency bins related to Doppler frequencies can be obtained as shown in the lower part of FIG. 9A by performing the first FFT processes on individual beat signals, thereby obtaining frequency spectra, and arranging the frequency spectra in chronological order, and performing a second FFT process. The relative velocities of the targets can be detected by detecting the frequency bins (hereinafter, also referred to as velocity bins) at which the peaks appear are detected.

This second FFT process will be referred to as a two-dimensional FFT process, and an example of the result of the two-dimensional FFT process is shown in FIG. 9B. In the FCM type, as shown in FIG. 9B, combinations of distance bins and velocity bins at which there are peaks having a predetermined power value or greater are specified as combinations of distance bins and velocity bins at which peaks exist. Then, on the basis of the combinations of distance bins and velocity bins specified as combinations at which peaks exist, the distances and relative velocities of the targets are derived. Also, in the case according to the FCM type, the pairing process is unnecessary.

Figures 10A, 10B:
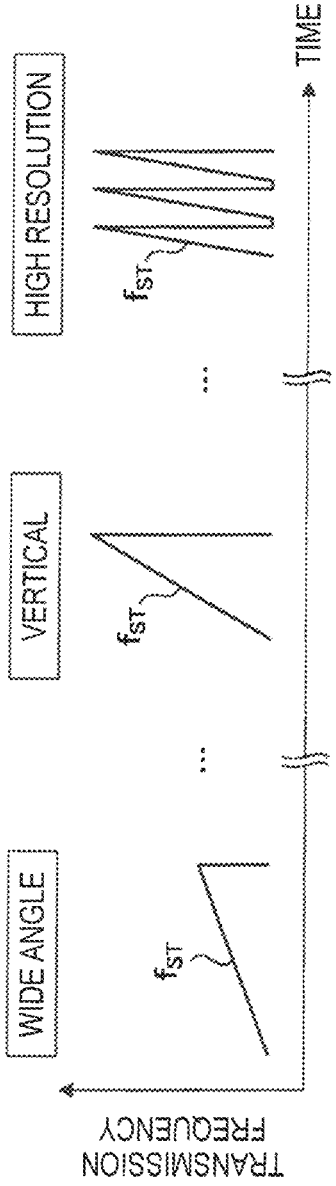
FIG. 10A is a view for explaining a first part of a processing-condition changing process according to a second embodiment.
FIG. 10B is a view for explaining a second part of the processing-condition changing process according to the second embodiment.

FIGS. 10A and 10B are views for explaining a first part and a second part of a processing-condition changing process according to the second embodiment. Also, in the second embodiment, in the FCM type, the signal transmitting unit 10 has a plurality of transmission antennae 13, and the transmission/reception control unit 31 can dispersively transmit different transmission waves using the transmitting antennae, thereby capable of performing target detecting processes having different characteristics.

For example, FIG. 10A schematically shows the waveforms of chirp waves usable in target detecting processes having characteristics "WIDE ANGLE", "VERTICAL", and "HIGH RESOLUTION", respectively. In the case of performing the target detecting processes having different characteristics, in each process of the signal processing procedure, for example, in the peak extracting process, it is possible to use different processing conditions 35b according to the characteristics of the target detecting processes.

FIG. 10B schematically shows a setting example of the processing conditions 35b in the above-described case. Specifically, as shown in FIG. 10B, with respect to peak extracting processes which have the same process identifier and are performed in target detecting processes having different characteristics "WIDE ANGLE", "VERTICAL", and "HIGH RESOLUTION", it is possible to set processing conditions 35b different in the default value and current value of the maximum number of processing objects and the selection condition, such that optimal detection results according to the target detection characteristics are obtained.

As described above, according to the radar device 1 of the second embodiment, according to the target detection characteristics, it is possible to improve the detection accuracy of targets TG while securing the processing performance.

In the above-described second embodiment, the case where the FCM type dispersively transmits transmission waves has been taken as an example; however, the FM-CW type may be used.

Also, in the individual embodiments described above, as an example of the incidence direction estimating method which is used in the radar device, ESPRIT has been taken. However, the present invention is not limited thereto. For example, DBF (Digital Beam Forming), PRISM (Propagator method based on an Improved Spatial-smoothing Matrix), MUSIC (Multiple Signal Classification), and so on also may be used.

Also, in the individual embodiments described above, the radar device 1 is mounted on the vehicle MC; however, needless to say, it may be mounted on a moving object other than vehicles, such as a ship or an aircraft.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device that detects targets by performing a signal processing procedure based on a transmission wave including a frequency-modulated continuous wave and reflected waves of the transmission wave from the targets, the radar device comprising:
at least one processor programmed to:
periodically perform the signal processing procedure based on beat signals, which are differential waves between the transmission wave and the reflected waves;
monitor each of a plurality of processing states of processes that are sequentially performed in the signal processing procedure; and
in response to detecting that a process in the signal processing procedure is in a high load state based on the processing state of the process, change a processing condition for subsequent-stage processes after the process.

2. The radar device according to claim 1, wherein:
the processing state includes a processing time, and
when the processing time of the process exceeds a predetermined amount of time, the at least one processor detects that the process is in the high load state.

3. The radar device according to claim 1, wherein the at least one processor is programmed to, in response to detecting that the process is in the high load state, change the processing condition such that a number of target data items on targets to be processing objects in the subsequent-stage processes becomes smaller than a number of target data items on targets to be processing objects in the process.

4. The radar device according to claim 3, wherein the at least one processor is programmed to:
perform the signal processing procedure while repeatedly performing each of the processes a predetermined number of times, and
in response to changing the processing condition for the subsequent-stage processes, change the predetermined number of times according to the number of target data items.

5. The radar device according to claim 3, wherein:
the processing condition includes a target data selection condition associated with the process according to the processing content of the processes, and
the at least one processor is programmed to select target data items to be processing objects in the subsequent-stage processes based on the target data selection condition.

6. The radar device according to claim 5, wherein the at least one processor is programmed to:
perform a peak extracting process of extracting peaks representing signal levels exceeding a predetermined threshold from frequency spectra obtained by performing frequency analysis on the beat signals, as one of the processes, and
in response to detecting the peak extracting process as the process that is in the high load state, use a condition that target data items corresponding to peaks having higher signal levels are preferentially selected, as the target data selection condition, to select the target data items.

7. The radar device according to claim 5, wherein the at least one processor is programmed to:
perform a filtering process of smoothing individual elements included in the target data items in a time axis direction, as a process in the signal processing procedure, and
in response to detecting the filtering process as the process which is in the high load state, use a condition that target data items having been held for longer times until a latest cycle are preferentially selected, as the target data selection condition, to select the target data items.

8. A target detecting method of detecting targets by performing a signal processing procedure based on a transmission wave including a frequency-modulated continuous wave and reflected waves of the transmission wave from the targets, the method comprising:
performing the signal processing procedure based on beat signals, which are differential waves between the transmission wave and the reflected waves;
monitoring each of processing states of processes that are sequentially performed in the signal processing procedure; and
in response to detecting that a process in the signal processing procedure is in a high load state based on the processing state of the process, changing a processing condition for subsequent-stage processes after the process.

* * * * *